United States Patent
Zhang et al.

(10) Patent No.: US 10,014,970 B2
(45) Date of Patent: Jul. 3, 2018

(54) MITIGATION OF INTER-BASE STATION RESYNCHRONIZATION LOSS IN LTE/LTE-A NETWORKS WITH CONTENTION-BASED SHARED FREQUENCY SPECTRUM

(71) Applicant: QUALCOMM Incorporated, San Diego, CA (US)

(72) Inventors: Xiaoxia Zhang, San Diego, CA (US); Vikas Jain, San Diego, CA (US); Srinivas Yerramalli, San Diego, CA (US); Tao Luo, San Diego, CA (US); Aleksandar Damnjanovic, Del Mar, CA (US); Kiran Kumar Somasundaram, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 15/041,635

(22) Filed: Feb. 11, 2016

(65) Prior Publication Data

US 2016/0262188 A1 Sep. 8, 2016

Related U.S. Application Data

(60) Provisional application No. 62/129,687, filed on Mar. 6, 2015.

(51) Int. Cl.
*H04W 4/00* (2018.01)
*H04J 11/00* (2006.01)
(Continued)

(52) U.S. Cl.
CPC ..... *H04J 11/0056* (2013.01); *H04W 74/0808* (2013.01); *H04W 16/14* (2013.01); *H04W 72/1268* (2013.01)

(58) Field of Classification Search
CPC .............. H04J 11/0056; H04W 74/0808
(Continued)

(56) References Cited

U.S. PATENT DOCUMENTS 9,642,036 B2 * 5/2017 Xiao ................. H04W 28/0289
9,762,368 B2 * 9/2017 Narasimha ............ H04L 5/0053
(Continued)

OTHER PUBLICATIONS

International Search Report and Written Opinion—PCT/US2016/017695—ISA/EPO—Aug. 19, 2016.
(Continued)

*Primary Examiner* — Thai Hoang
(74) *Attorney, Agent, or Firm* — Nerrie M. Zohn

(57) ABSTRACT

Mitigation of inter-base station resynchronization loss in wireless networks including contention-based shared frequency spectrum is discussed. Aspects of such mitigation provide for base stations entering into an idle mode when a transmission opportunity occurs in a radio frame of the next resynchronization occasion. Additional aspects provide for the base station to signal a flexible listen before talk (LBT) frame length to the user equipment (UE), either with or without explicit signaling of the downlink-uplink division. Further aspects provide for the base station to signal a reset indication to UEs that will prompt the UEs to monitor for downlink channel reserving signals prior to the current LBT frame ending by the resynchronization occasion.

30 Claims, 13 Drawing Sheets

(51) Int. Cl.
*H04W 74/08* (2009.01)
*H04W 16/14* (2009.01)
*H04W 72/12* (2009.01)

(58) Field of Classification Search
USPC ............... 370/328–330, 335–338, 341–348
See application file for complete search history.

(56) References Cited

U.S. PATENT DOCUMENTS

| | | | | |
|---|---|---|---|---|
| 2009/0067448 | A1* | 3/2009 | Stanwood | H04L 12/413 370/447 |
| 2011/0128895 | A1* | 6/2011 | Sadek | H04W 16/14 370/280 |
| 2015/0365830 | A1* | 12/2015 | Wei | H04J 3/1694 370/280 |
| 2015/0365880 | A1* | 12/2015 | Malladi | H04L 5/0007 370/312 |
| 2016/0007353 | A1* | 1/2016 | Malladi | H04L 5/0053 370/329 |
| 2016/0029373 | A1* | 1/2016 | Seok | H04L 5/0055 370/338 |
| 2016/0043855 | A1* | 2/2016 | Seok | H04L 5/0055 370/330 |
| 2016/0050659 | A1* | 2/2016 | Seok | H04L 1/0003 370/338 |
| 2016/0057770 | A1* | 2/2016 | Yerramalli | H04B 7/0811 370/329 |
| 2016/0066294 | A1* | 3/2016 | Luo | H04W 56/0045 370/336 |
| 2016/0323915 | A1* | 11/2016 | Liu | H04W 16/14 |
| 2016/0353474 | A1* | 12/2016 | Zhang | H04L 1/0026 |
| 2017/0012748 | A1* | 1/2017 | Dabeer | H04L 5/0007 |
| 2017/0013479 | A1* | 1/2017 | Sun | H04W 24/02 |
| 2017/0034670 | A1* | 2/2017 | Zhang | H04W 4/06 |
| 2017/0079010 | A1* | 3/2017 | Zhang | H04W 72/005 |
| 2017/0223739 | A1* | 8/2017 | Mallik | H04W 56/002 |
| 2017/0223763 | A1* | 8/2017 | Rahman | H04W 76/025 |
| 2017/0230986 | A1* | 8/2017 | Moon | H04W 74/08 |
| 2017/0289987 | A1* | 10/2017 | Seok | H04W 72/0406 |
| 2018/0048412 | A1 | 2/2018 | Zhang et al. | |

OTHER PUBLICATIONS

Nokia Networks et al: "On Listen Before Talk and Channel Access", 3GPP Draft; R1-145003, 3rd Generation Partnership Project (3GPP), Mobile Competence Centre ; 650, Route Des Lucioles; F-06921 Sophia-Antipolis Cedex; France, vol. RAN WG1, No. San Francisco, USA; Nov. 1, 2014-Nov. 21, 2014 Nov. 17, 2014 (Nov. 17, 2014), XP050895111, Retrieved from the Internet: URL: http//www.3gpp.org/ftp/Meetings_3GPP_SYNC/RAN1/Docs/[retrieved on Nov. 17, 2014] paragraph [0003]-paragraph [0005].

Nokia Networks et al: "On LTE LAA functionalities facilitating co-existence", 3GPP Draft; R1-144185, 3rd Generation Partnership Project (3GPP), Mobilecompetence Centre ; 650, Route Des Lucioles; F-06921 Sophia-Antipolis Cedex; France, vol. RAN WG1, No. Ljubljana, Slovenia; Oct. 6, 2014-Oct. 10, 2014, Oct. 5, 2014 (Oct. 5, 2014), XP050875466, Retrieved from the Internet: URL:http://www .3gpp .org/ftp/Meetings_3GPP_SYNC/RAN1/Docs/ [retrieved on Oct. 5, 2014] paragraph [0004].

Partial International Search Report—PCT/US2016/017695—ISA/EPO—Jun. 2, 2016.

Qualcomm Incorporated: "Physical Layer Options for LAA", 3GPP Draft; R1-150477 Physical Layer Options for LAA, 3rd Generation Partnership Project (3GPP), Mobile Competence Centre; 650, Route Des Lucioles ; F-06921 Sophia-Antipolis Cedex; France vol. RAN WG1, No. Athens, Greece; Feb. 9, 2015-Feb. 13, 2015 Feb. 8, 2015 (Feb. 8, 2015), XP050933685, Retrieved from the Internet: URL:http://www.3gpp.org/ftp/Meetings_3GPP_SYNC/RAN1/Docs/ - - [retrieved on Feb. 8, 2015] Paragraph [02.2].

Samsung: "Discussion on UL Transmission for LAA," 3GPP Draft; R1-150368, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 9, 2015-Feb. 13, 2015, Feb. 8, 2015, XP050933577, Retrieved from the Internet URL: http://www.3gpp.org/ftp/Meetings_3GPP_SYNC/RAN1/Docs/ [retrieved on Feb. 8, 2015], p. 6, paragraph 2.4.

* cited by examiner

MITIGATION OF INTER-BASE STATION RESYNCHRONIZATION LOSS IN LTE/LTE-A NETWORKS WITH CONTENTION-BASED SHARED FREQUENCY SPECTRUM

CROSS-REFERENCE TO RELATED APPLICATIONS

This application claims the benefit of U.S. Provisional Patent Application No. 62/129,687, entitled, "MITIGATION OF INTER-BASE STATION RESYNCHRONIZATION LOSS IN LTE/LTE-A NETWORKS WITH CONTENTION-BASED SHARED FREQUENCY SPECTRUM," filed on Mar. 6, 2015, which is expressly incorporated by reference herein in its entirety.

BACKGROUND

Field

Aspects of the present disclosure relate generally to wireless communication systems, and more particularly, to mitigation of inter-base station resynchronization loss in long term evolution (LTE)/LTE-Advanced (LTE-A) networks with contention-based shared frequency spectrum.

Background

Wireless communication systems are widely deployed to provide various types of communication content, such as voice, video, packet data, messaging, broadcast, or the like. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

Some modes of communication may enable communications between a base station and a UE over a contention-based shared radio frequency spectrum band, or over different radio frequency spectrum bands (e.g., a licensed radio frequency spectrum band or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. An unlicensed radio frequency spectrum band may also provide service in areas where access to a licensed radio frequency spectrum band is unavailable.

Prior to gaining access to, and communicating over, a contention-based shared radio frequency spectrum band, a base station or UE may perform a listen before talk (LBT) procedure to contend for access to the shared radio frequency spectrum band. An LBT procedure may include performing a clear channel assessment (CCA) procedure to determine whether a channel of the contention-based shared radio frequency spectrum band is available. When it is determined that the channel of the contention-based shared radio frequency spectrum band is available, a channel reserving signal, such as a channel usage beacon signal (CUBS) may be transmitted to reserve the channel.

SUMMARY

Various aspects of the present disclosure are directed to mitigating capacity and efficiency loss caused by inter-base station resynchronization in wireless networks with contention-based shared frequency spectrum including unlicensed spectrum. Base stations may provide for flexibility in listen before talk (LBT) frame length or in the periods during which user equipments (UEs) monitor for downlink channel usage beacon signal (CUBS). In one such aspect for mitigating loss, base stations may enter into an idle mode when a transmission opportunity occurs in a radio frame containing the next resynchronization occasion. Additional aspects provide for the base station to signal a flexible LBT frame length to the UE, either with or without explicit signaling of the downlink-uplink division. Further aspects provide for the base station to signal a reset indication to UEs that will prompt the UEs to monitor for downlink channel reserving signals in the current LBT frame prior to the resynchronization occasion.

In a further aspect of the present disclosure, a method of wireless communication includes determining a radio frame in which a next resynchronization occasion is located, detecting an opportunity to contend for a contention-based resource for the radio frame, remaining idle in response to the opportunity detected in the radio frame, and performing a clear channel assessment (CCA) check at the next resynchronization occasion.

In a further aspect of the present disclosure, a method of wireless communication includes detecting a successful CCA check to reserve a contention-based resource for a next LBT frame, determining a length of the LBT frame, and signaling the length in a frame format indicator in response to detecting the successful CCA check.

In a further aspect of the present disclosure, a method of wireless communication includes detecting a downlink channel reserving signal from a serving base station, obtaining a LBT frame length from a downlink channel, wherein the LBT frame length identifies a length of a next LBT frame, monitoring for an uplink grant for one or a plurality of subframes of the next LBT frame, and determining which ones of the plurality of subframes within the next LBT frame are uplink subframes based on the uplink grant.

In a further aspect of the present disclosure, a method of wireless communication includes obtaining a reset indicator from a base station, wherein the reset indicator identifies a subframe during which a UE is to monitor for a downlink channel reserving signal of the base station, and monitoring for the downlink channel reserving signal at the subframe indicated by the reset indicator regardless of a last subframe a previous downlink channel reserving signal was detected.

In a further aspect of the present disclosure, an apparatus configured for wireless communication includes means for determining a radio frame in which a next resynchronization occasion is located, means for detecting an opportunity to contend for a contention-based resource for the radio frame, means for remaining idle in response to the opportunity detected in the radio frame, and means for performing a CCA check at the next resynchronization occasion.

In a further aspect of the present disclosure, an apparatus configured for wireless communication includes means for detecting a successful CCA check to reserve a contention-based resource for a next LBT frame, means for determining a length of the LBT frame, and means for signaling the length in a frame format indicator in response to detecting the successful CCA check.

In a further aspect of the present disclosure, an apparatus configured for wireless communication includes means for detecting a downlink channel reserving signal from a serving base station, means for obtaining a LBT frame length from a frame format indicator transmitted with the downlink channel reserving signal, wherein the LBT frame length identifies a length of a next LBT frame, means for monitoring for an uplink grant for each of a plurality of subframes of the next LBT frame, and means for determining which ones of the plurality of subframes within the next LBT frame are uplink subframes based on the uplink grant.

In a further aspect of the present disclosure, an apparatus configured for wireless communication includes means for obtaining a reset indicator from a base station, wherein the reset indicator identifies a subframe during which a UE is to monitor for a downlink channel reserving signal of the base station, and means for monitoring for the downlink channel reserving signal at the subframe indicated by the reset indicator regardless of a last subframe a previous downlink channel reserving signal was detected.

In a further aspect of the present disclosure, a computer-readable medium having program code recorded thereon. This program code includes code to determine a radio frame in which a next resynchronization occasion is located, code to detect an opportunity to contend for a contention-based resource for the radio frame, code to remain idle in response to the opportunity detected in the radio frame, and code to perform a CCA check at the next resynchronization occasion.

In a further aspect of the present disclosure, a computer-readable medium having program code recorded thereon. This program code includes code to detect a successful CCA check to reserve a contention-based resource for a next LBT frame, code to determine a length of the LBT frame, and code to signal the length in a frame format indicator in response to detecting the successful CCA check.

In a further aspect of the present disclosure, a computer-readable medium having program code recorded thereon. This program code includes code to detect a downlink channel reserving signal from a serving base station, code to obtain a LBT frame length from a frame format indicator transmitted with the downlink channel reserving signal, wherein the LBT frame length identifies a length of a next LBT frame, code to monitor for an uplink grant for each of a plurality of subframes of the next LBT frame, and code to determine which ones of the plurality of subframes within the next LBT frame are uplink subframes based on the uplink grant.

In a further aspect of the present disclosure, a computer-readable medium having program code recorded thereon. This program code includes code to obtain a reset indicator from a base station, wherein the reset indicator identifies a subframe during which a UE is to monitor for a downlink channel reserving signal of the base station, and code to monitor for the downlink channel reserving signal at the subframe indicated by the reset indicator regardless of a last subframe a previous downlink channel reserving signal was detected.

In a further aspect of the present disclosure, an apparatus includes at least one processor and a memory coupled to the processor. The processor is configured to determine a radio frame in which a next resynchronization occasion is located, code to detect an opportunity to contend for a contention-based resource for the radio frame, code to remain idle in response to the opportunity detected in the radio frame, and code to perform a CCA check at the next resynchronization occasion.

In a further aspect of the present disclosure, an apparatus includes at least one processor and a memory coupled to the processor. The processor is configured to detect a successful CCA check to reserve a contention-based resource for a next LBT frame, code to determine a length of the LBT frame, and code to signal the length in a frame format indicator in response to detecting the successful CCA check.

In a further aspect of the present disclosure, an apparatus includes at least one processor and a memory coupled to the processor. The processor is configured to detect a downlink channel reserving signal from a serving base station, code to obtain a LBT frame length from a frame format indicator transmitted with the downlink channel reserving signal, wherein the LBT frame length identifies a length of a next LBT frame, code to monitor for an uplink grant for each of a plurality of subframes of the next LBT frame, and code to determine which ones of the plurality of subframes within the next LBT frame are uplink subframes based on the uplink grant.

In a further aspect of the present disclosure, an apparatus includes at least one processor and a memory coupled to the processor. The processor is configured to obtain a reset indicator from a base station, wherein the reset indicator identifies a subframe during which a UE is to monitor for a downlink channel reserving signal of the base station, and code to monitor for the downlink channel reserving signal at the subframe indicated by the reset indicator regardless of a last subframe a previous downlink channel reserving signal was detected.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
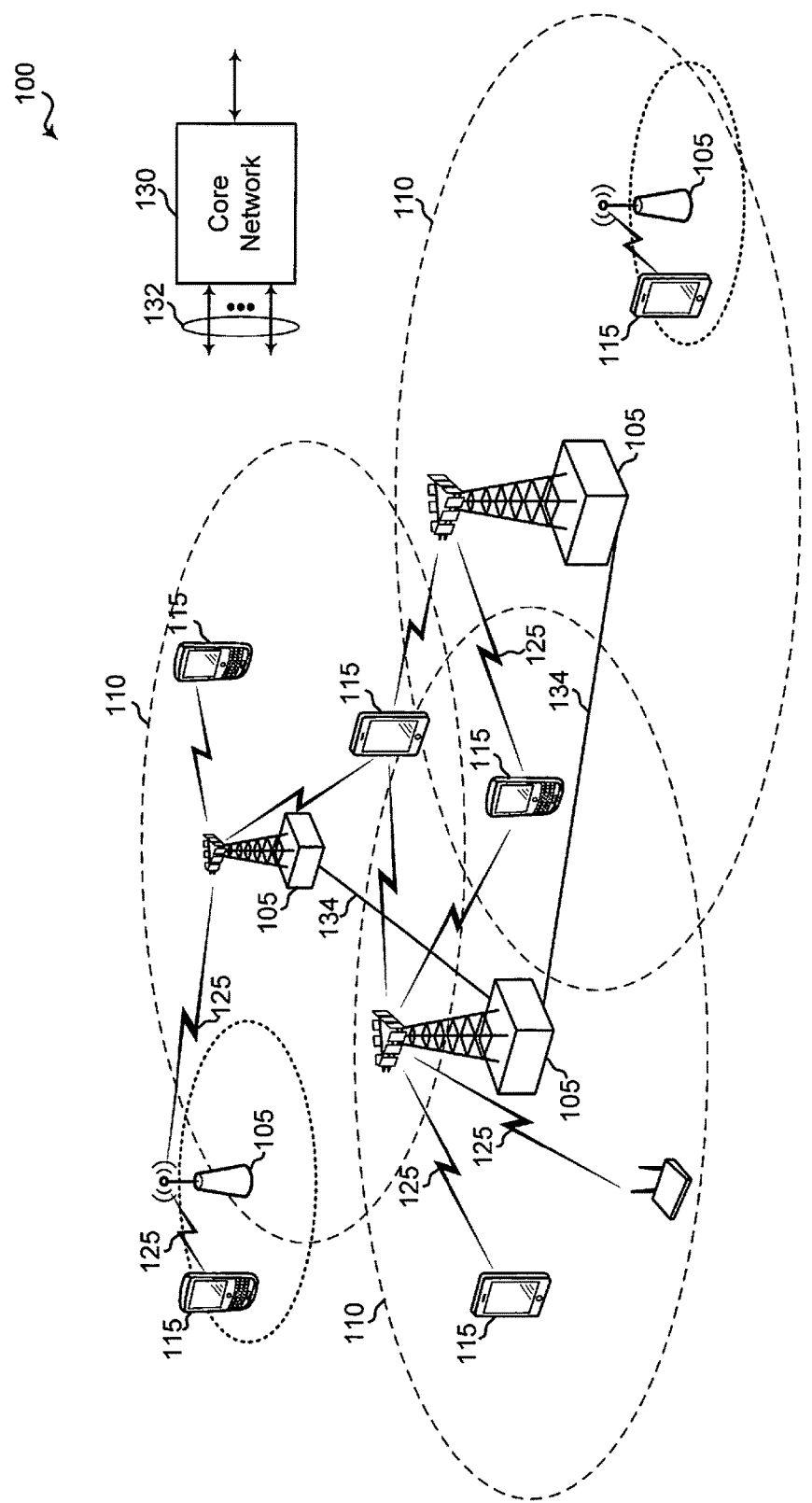
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Techniques are described in which an unlicensed radio frequency spectrum band is used for at least a portion of contention-based communications over a wireless communication system. In some examples, a contention-based shared radio frequency spectrum band may be used for Long Term Evolution (LTE) communications or LTE-Advanced (LTE-A) communications. The contention-based radio frequency spectrum band may be used in combination with, or independent from, a non-contention licensed radio frequency spectrum band. In some examples, the contention-based radio frequency spectrum band may be a radio frequency spectrum band for which a device may also need to contend for access because the radio frequency spectrum band is available, at least in part, for unlicensed use, such as WiFi use.

With increasing data traffic in cellular networks that use a licensed radio frequency spectrum band, offloading of at least some data traffic to a contention-based shared radio frequency spectrum band, such as in an unlicensed band, may provide a cellular operator (e.g., an operator of a public land mobile network (PLMN) or a coordinated set of base stations defining a cellular network, such as an LTE/LTE-A network) with opportunities for enhanced data transmission capacity. As noted above, before communicating over a contention-based shared radio frequency spectrum band, such as unlicensed spectrum, devices may perform an LBT procedure to gain access to the shared radio frequency spectrum band. Such an LBT procedure may include performing a CCA procedure (or an extended CCA procedure) to determine whether a channel of the unlicensed radio frequency spectrum band is available. When it is determined that the channel of the contention-based radio frequency spectrum band is available, a channel reserving signal (e.g., a CUBS) may be transmitted to reserve the channel. When it is determined that a channel is not available, a CCA procedure (or extended CCA procedure) may be performed for the channel again at a later time.

When a base station and/or a UE includes multiple antenna ports capable of transmitting over the contention-based shared radio frequency spectrum band, transmissions from different antenna ports may interfere with one another due to correlation between transmitted signals. For a channel reserving signal used to reserve a channel of a contention-based shared radio frequency spectrum band, reduction of interference due to correlation between transmitted signals may be important to provide good detection capabilities for reserving the channel, and to prevent false detection that would unnecessarily reserve the channel and prevent other devices from using the channel. To reduce such interference due to cross-correlation of signals from different antennas or auto-correlation of a signal from a single antenna, the base station or the UE may generate a sequence based at least in part on an antenna port identifier associated with an antenna port that transmits the sequence of the channel reserving signal. In this way, correlation of channel reserving signals may be reduced, thereby improving detection capabilities of the signal transmission, resulting in more effective and accurate reservations of a channel of the contention-based shared radio frequency spectrum band.

In other words, for a channel reserving signal used to reserve a channel of an unlicensed radio frequency spectrum band, the channel reserving signal should be configured with good detectability to reduce false alarms, so that the channel reservation may be easily detected by other devices trying to access the shared radio frequency spectrum band. Thus, the channel reserving signal sequence should have good auto-correlation properties and good cross-correlation properties with sequences from neighbor base stations. For example, a primary synchronization signal (PSS), a secondary synchronization signal (SSS), and/or a channel state information-reference signal (CSI-RS) may not have good auto-correlation properties or good cross-correlation properties between different base stations in the contention-based shared radio frequency spectrum band. Thus, the channel reserving signal sequence should be configured based at least in part on an antenna port identifier to provide good auto-correlation and cross-correlation properties.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is an illustration of an example wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with other base stations 105 over backhaul links 134 (e.g., X2, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions from a UE 115 to a base station 105. The downlink transmissions may also be called forward link transmissions, while the uplink transmissions may also be called reverse link transmissions. In some examples, UL transmissions may include transmissions of uplink control information, which uplink control information may be transmitted over an uplink control channel (e.g., a physical uplink control channel (PUCCH) or enhanced PUCCH (ePUCCH)). The uplink control information may include, for example, acknowledgements or non-acknowledgements of downlink transmissions, or channel state information. Uplink transmissions may also include transmissions of data, which data may be transmitted over a physical uplink shared channel (PUSCH) or enhanced PUSCH (ePUSCH). Uplink transmissions may also include the transmission of a sounding reference signal (SRS) or enhanced SRS (eSRS), a physical random access channel (PRACH) or enhanced PRACH (ePRACH) (e.g., in a dual connectivity mode or the standalone mode described with reference to FIGS. 2A and 2B), or a scheduling request (SR) or enhanced SR (eSR) (e.g., in the standalone mode described with reference to FIGS. 2A and 2B). References in this disclosure to a PUCCH, a PUSCH, a PRACH, an SRS, or an SR are presumed to inherently include references to a respective ePUCCH, ePUSCH, ePRACH, eSRS, or eSR.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

The wireless communication system 100 may also or alternatively support operation over a non-contention licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a contention-based shared radio frequency spectrum band (e.g., an unlicensed radio frequency spectrum band for which transmitting apparatuses may need to contend for access because the radio frequency spectrum band is available for unlicensed use, such as WiFi use). Upon winning a contention for access to the contention-based shared radio frequency spectrum band, a transmitting apparatus (e.g., a base station 105 or UE 115) may transmit one or more channel reserving signals (e.g., one or more CUBS) over the unlicensed radio frequency spectrum band. The channel reserving signals may serve to reserve the unlicensed radio frequency spectrum by providing a detectable energy on the unlicensed radio frequency spectrum band. The channel reserving signals may also serve to identify a transmitting apparatus and/or a transmitting antenna, or may serve to synchronize the transmitting apparatus and a receiving apparatus. In some examples, a channel reserving signal transmission may commence at a symbol period boundary (e.g., an OFDM symbol period boundary). In other examples, a CUBS transmission may commence between symbol period boundaries.

The number and arrangement of components shown in FIG. 1 are provided as an example. In practice, wireless communication system 100 may include additional devices, fewer devices, different devices, or differently arranged devices than those shown in FIG. 1. Additionally, or alternatively, a set of devices (e.g., one or more devices) of wireless communication system 100 may perform one or more functions described as being performed by another set of devices of wireless communication system 100.

Figure 2A:
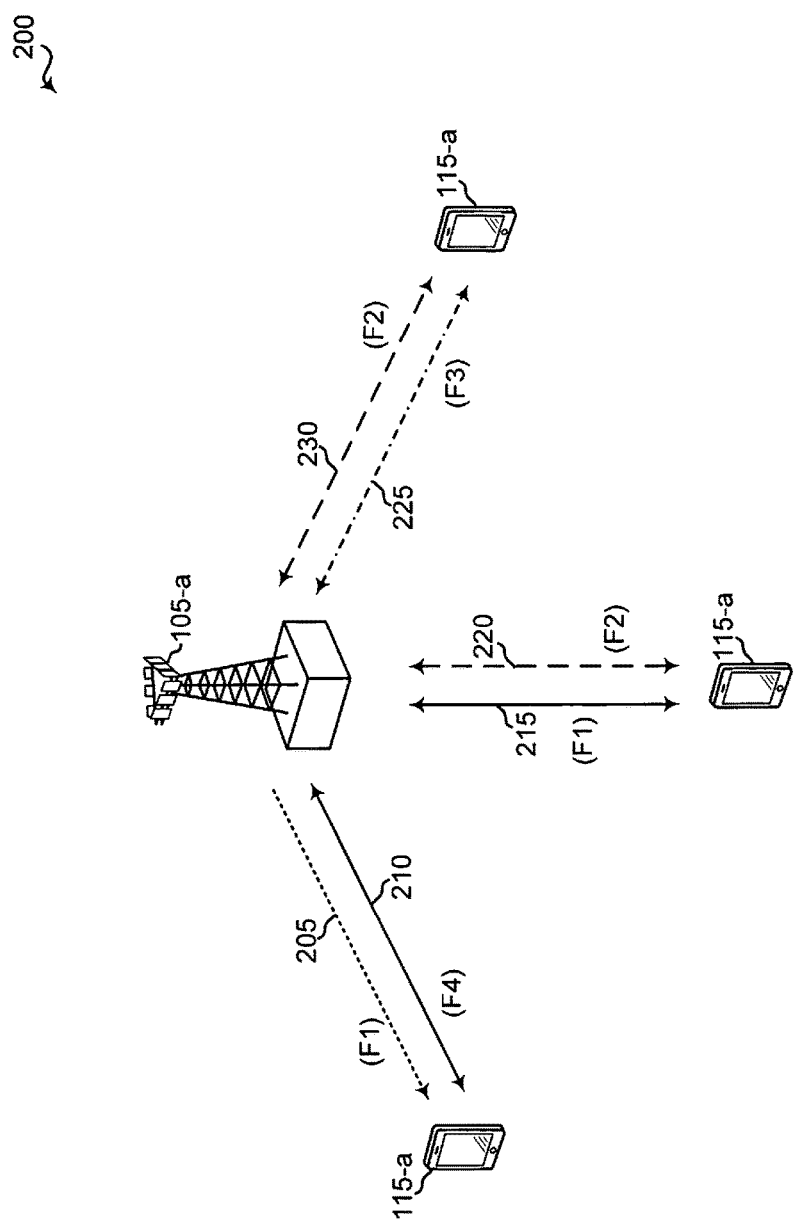
FIG. 2A shows a diagram that illustrates examples of deployment scenarios for using LTE in an unlicensed spectrum according to various embodiments.

Turning next to FIG. 2A, a diagram 200 shows examples of a supplemental downlink mode (e.g., licensed assisted access (LAA) mode) and of a carrier aggregation mode for an LTE network that supports LTE/LTE-A extended to contention-based shared spectrum. The diagram 200 may be an example of portions of the system 100 of FIG. 1. Moreover, the base station 105-a may be an example of the base stations 105 of FIG. 1, while the UEs 115-a may be examples of the UEs 115 of FIG. 1.

In the example of a supplemental downlink mode (e.g., LAA mode) in diagram 200, the base station 105-a may transmit OFDMA communications signals to a UE 115-a using a downlink 205. The downlink 205 is associated with a frequency F1 in an unlicensed spectrum. The base station 105-a may transmit OFDMA communications signals to the same UE 115-a using a bidirectional link 210 and may receive SC-FDMA communications signals from that UE 115-a using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-a. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-a may transmit communications signals to a UE 115-a using a bidirectional link 215 and may receive communications signals from the same UE 115-a using the bidirectional link 215. The bidirectional link 215 is associated with the frequency F1 in the unlicensed spectrum. The base station 105-a may also transmit communications signals to the same UE 115-a using a bidirectional link 220 and may receive communications signals from the same UE 115-a using the bidirectional link 220. The bidirectional link 220 is associated with a frequency F2 in a licensed spectrum. The bidirectional link 215 may provide a downlink and uplink capacity offload for the base station 105-a. Like the supplemental downlink (e.g., LAA mode) described above, this scenario may occur with any service provider (e.g., MNO) that uses a licensed spectrum and needs to relieve some of the traffic and/or signaling congestion.

In another example of a carrier aggregation mode in diagram 200, the base station 105-a may transmit communications signals to a UE 115-a using a bidirectional link 225 and may receive communications signals from the same UE 115-a using the bidirectional link 225. The bidirectional link 225 is associated with the frequency F3 in an unlicensed spectrum. The base station 105-a may also transmit communications signals to the same UE 115-*a* using a bidirectional link 230 and may receive communications signals from the same UE 115-*a* using the bidirectional link 230. The bidirectional link 230 is associated with the frequency F2 in the licensed spectrum. The bidirectional link 225 may provide a downlink and uplink capacity offload for the base station 105-*a*. This example and those provided above are presented for illustrative purposes and there may be other similar modes of operation or deployment scenarios that combine LTE/LTE-A with or without contention-based shared spectrum for capacity offload.

As described above, the typical service provider that may benefit from the capacity offload offered by using LTE/LTE-A extended to contention-based spectrum is a traditional MNO with LTE spectrum. For these service providers, an operational configuration may include a bootstrapped mode (e.g., supplemental downlink (e.g., LAA mode), carrier aggregation) that uses the LTE primary component carrier (PCC) on the non-contention spectrum and the LTE secondary component carrier (SCC) on the contention-based spectrum.

In the supplemental downlink mode, control for LTE/LTE-A extended to contention-based spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in an unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE/LTE-A extended to contention-based shared spectrum (e.g., bidirectional links 215 and 225). The carrier aggregation mechanisms supported when using LTE/LTE-A extended to contention-based shared spectrum may fall under a hybrid frequency division duplexing-time division duplexing (FDD-TDD) carrier aggregation or a TDD-TDD carrier aggregation with different symmetry across component carriers.

Figure 2B:
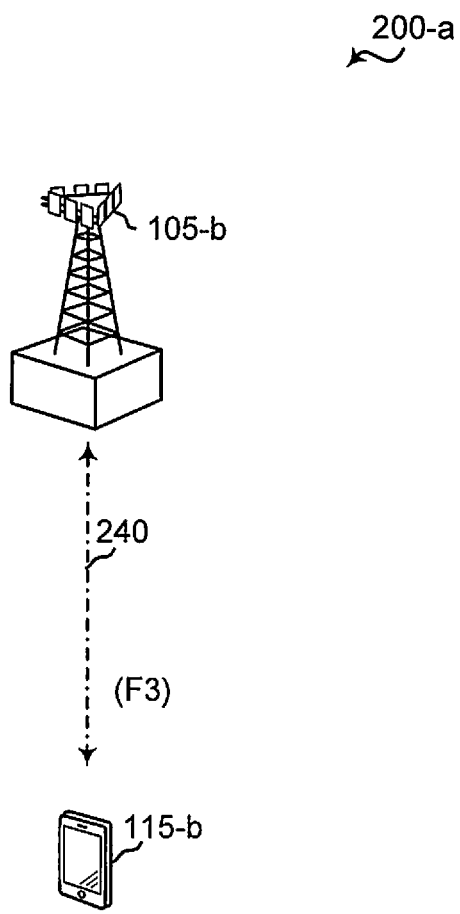
FIG. 2B shows a diagram that illustrates another example of a deployment scenario for using LTE in an unlicensed spectrum according to various embodiments.

FIG. 2B shows a diagram 200-*a* that illustrates an example of a standalone mode for LTE/LTE-A extended to contention-based shared spectrum. The diagram 200-*a* may be an example of portions of the system 100 of FIG. 1. Moreover, the base station 105-*b* may be an example of the base stations 105 of FIG. 1 and the base station 105-*a* of FIG. 2A, while the UE 115-*b* may be an example of the UEs 115 of FIG. 1 and the UEs 115-*a* of FIG. 2A.

In the example of a standalone mode in diagram 200-*a*, the base station 105-*b* may transmit communications signals to the UE 115-*b* using a bidirectional link 240 and may receive communications signals from the UE 115-*b* using the bidirectional link 240. The bidirectional link 240 is associated with the frequency F3 in a contention-based shared spectrum described above with reference to FIG. 2A. The standalone mode may be used in non-traditional wireless access scenarios, such as in-stadium access (e.g., unicast, multicast). An example of the typical service provider for this mode of operation may be a stadium owner, cable company, event hosts, hotels, enterprises, and large corporations that do not have licensed spectrum. For these service providers, an operational configuration for the standalone mode may use the PCC on the contention-based spectrum. Moreover, LBT may be implemented on both the base station and the UE.

In some examples, a transmitting apparatus such as one of the base stations 105 or 105-*a* described with reference to FIG. 1, 2A, or 2B, or one of the UEs 115, 115-*a*, or 115-*b* described with reference to FIG. 1, 2A, or 2B, may use a gating interval to gain access to a channel of a contention-based shared radio frequency spectrum band (e.g., to a physical channel of an unlicensed radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based at least in part on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of a contention-based shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the contention-based shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

The number and arrangement of components shown in FIGS. 2A and 2B are provided as an example. In practice, wireless communication system 200 may include additional devices, fewer devices, different devices, or differently arranged devices than those shown in FIGS. 2A and 2B.

Figure 3:
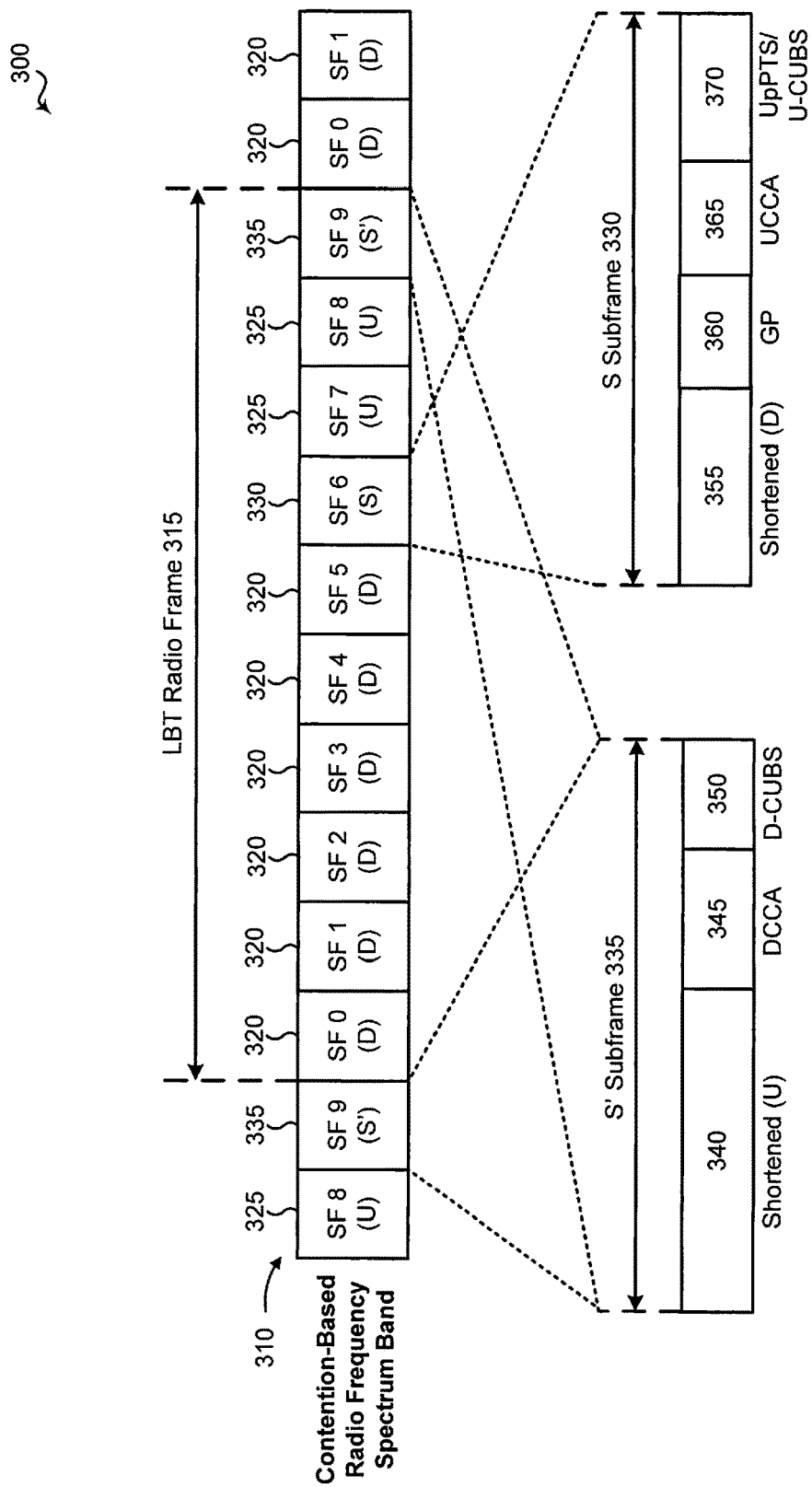
FIG. 3 shows a diagram that illustrates an example of carrier aggregation when using LTE concurrently in licensed and unlicensed spectrum according to various embodiments.

FIG. 3 is an illustration of an example 300 of a wireless communication 310 over an unlicensed radio frequency spectrum band, in accordance with various aspects of the present disclosure. In some examples, an LBT radio frame 315 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320 and, in some examples, a transition between LBT radio frames.

During the S' subframe 335, a downlink clear channel assessment (CCA) procedure 345 may be performed by one or more base stations, such as one or more of the base stations 105 or 105-*a* described with reference to FIG. 1 or 2, to reserve, for a period of time, a channel of the contention-based shared radio frequency spectrum band over which the wireless communication 310 occurs. Following a successful downlink CCA procedure 345 by a base station, the base station may transmit a preamble, such as a channel usage beacon signal (CUBS) (e.g., a downlink CUBS (D-CUBS 350)) to provide an indication to other base stations or apparatuses (e.g., UEs, WiFi access points, etc.) that the base station has reserved the channel. In some examples, a D-CUBS 350 may be transmitted using a plurality of interleaved resource blocks. Transmitting a D-CUBS 350 in this manner may enable the D-CUBS 350 to occupy at least a certain percentage of the available frequency bandwidth of the contention-based shared radio frequency spectrum band and satisfy one or more regulatory requirements (e.g., a requirement that transmissions over an unlicensed radio frequency spectrum band occupy at least 80% of the available frequency bandwidth). The D-CUBS 350 may in some examples take a form similar to that of an LTE/LTE-A cell-specific reference signal (CRS) or a channel state information reference signal (CSI-RS). When the downlink CCA procedure 345 fails, the D-CUBS 350 may not be transmitted.

The S' subframe 335 may include a plurality of OFDM symbol periods (e.g., 14 OFDM symbol periods). A first portion of the S' subframe 335 may be used by a number of UEs as a shortened uplink (U) period 340. A second portion of the S' subframe 335 may be used for the downlink CCA procedure 345. A third portion of the S' subframe 335 may be used by one or more base stations that successfully contend for access to the channel of the contention-based shared radio frequency spectrum band to transmit the D-CUBS 350.

During the S subframe 330, an uplink CCA procedure 365 may be performed by one or more UEs, such as one or more of the UEs 115, 215, 215-a, 215-b, or 215-c described above with reference to FIG. 1, 2A, or 2B, to reserve, for a period of time, the channel over which the wireless communication 310 occurs. Following a successful uplink CCA procedure 365 by a UE, the UE may transmit a preamble, such as an uplink CUBS (U-CUBS 370) to provide an indication to other UEs or apparatuses (e.g., base stations, WiFi access points, etc.) that the UE has reserved the channel. In some examples, a U-CUBS 370 may be transmitted using a plurality of interleaved resource blocks. Transmitting a U-CUBS 370 in this manner may enable the U-CUBS 370 to occupy at least a certain percentage of the available frequency bandwidth of the contention-based radio frequency spectrum band and satisfy one or more regulatory requirements (e.g., the requirement that transmissions over the contention-based radio frequency spectrum band occupy at least 80% of the available frequency bandwidth). The U-CUBS 370 may in some examples take a form similar to that of an LTE/LTE-A CRS or CSI-RS. When the uplink CCA procedure 365 fails, the U-CUBS 370 may not be transmitted.

The S subframe 330 may include a plurality of OFDM symbol periods (e.g., 14 OFDM symbol periods). A first portion of the S subframe 330 may be used by a number of base stations as a shortened downlink (D) period 355. A second portion of the S subframe 330 may be used as a guard period (GP) 360. A third portion of the S subframe 330 may be used for the uplink CCA procedure 365. A fourth portion of the S subframe 330 may be used by one or more UEs that successfully contend for access to the channel of the contention-based radio frequency spectrum band as an uplink pilot time slot (UpPTS) or to transmit the U-CUBS 370.

In some examples, the downlink CCA procedure 345 or the uplink CCA procedure 365 may include the performance of a single CCA procedure. In other examples, the downlink CCA procedure 345 or the uplink CCA procedure 365 may include the performance of an extended CCA procedure. The extended CCA procedure may include a random number of CCA procedures, and in some examples may include a plurality of CCA procedures.

As indicated above, FIG. 3 is provided as an example. Other examples are possible and may differ from what was described in connection with FIG. 3.

Figure 4:
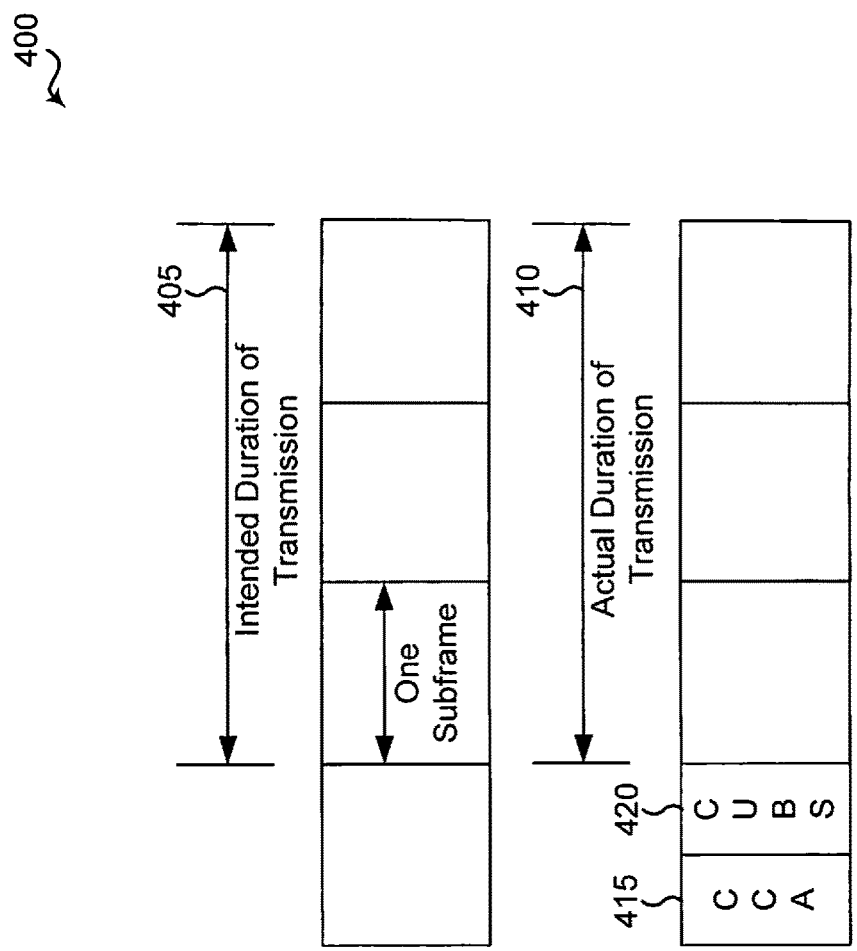
FIG. 4 is a block diagram conceptually illustrating a design of a base station/eNB and a UE configured according to one aspect of the present disclosure.

FIG. 4 is an illustration of an example 400 of a CCA procedure 415 performed by a transmitting apparatus when contending for access to a contention-based shared radio frequency spectrum band, in accordance with various aspects of the present disclosure. In some examples, the CCA procedure 415 may be an example of the downlink CCA procedure 345 or uplink CCA procedure 365 described with reference to FIG. 3. The CCA procedure 415 may have a fixed duration. In some examples, the CCA procedure 415 may be performed in accordance with an LBT-frame based equipment (LBT-FBE) protocol (e.g., the LBT-FBE protocol described by EN 301 893). Following the CCA procedure 415, a channel reserving signal, such as a CUBS 420, may be transmitted, followed by a data transmission (e.g., an uplink transmission or a downlink transmission). By way of example, the data transmission may have an intended duration 405 of three subframes and an actual duration 410 of three subframes.

As indicated above, FIG. 4 is provided as an example. Other examples are possible and may differ from what was described in connection with FIG. 4.

Figure 5:
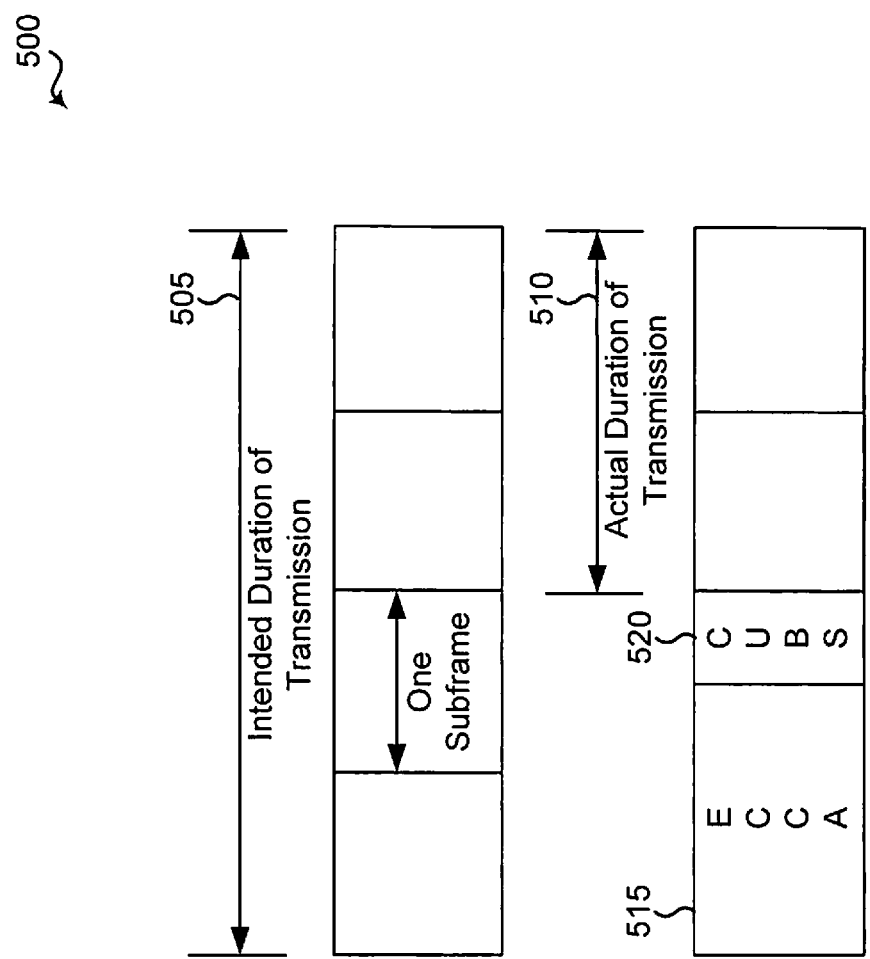
FIG. 5 is an illustration of an example of an extended CCA (ECCA) procedure performed by a transmitting apparatus when contending for access to a contention-based shared radio frequency spectrum band, in accordance with various aspects of the present disclosure.

FIG. 5 is an illustration of an example 500 of an extended CCA (ECCA) procedure 515 performed by a transmitting apparatus when contending for access to a contention-based shared radio frequency spectrum band, in accordance with various aspects of the present disclosure. In some examples, the ECCA procedure 515 may be an example of the downlink CCA procedure 345 or uplink CCA procedure 365 described with reference to FIG. 3. The ECCA procedure 515 may include a random number of CCA procedures, and in some examples may include a plurality of CCA procedures. The ECCA procedure 515 may, therefore, have a variable duration. In some examples, the ECCA procedure 515 may be performed in accordance with an LBT-load based equipment (LBT-LBE) protocol (e.g., the LBT-LBE protocol described by EN 301 893). The ECCA procedure 515 may provide a greater likelihood of winning contention to access the contention-based shared radio frequency spectrum band, but at a potential cost of a shorter data transmission. Following the ECCA procedure 515, a channel reserving signal, such as a CUBS 520, may be transmitted, followed by a data transmission. By way of example, the data transmission may have an intended duration 505 of three subframes and an actual duration 510 of two subframes.

As indicated above, FIG. 5 is provided as an example. Other examples are possible and may differ from what was described in connection with FIG. 5.

Figure 6:
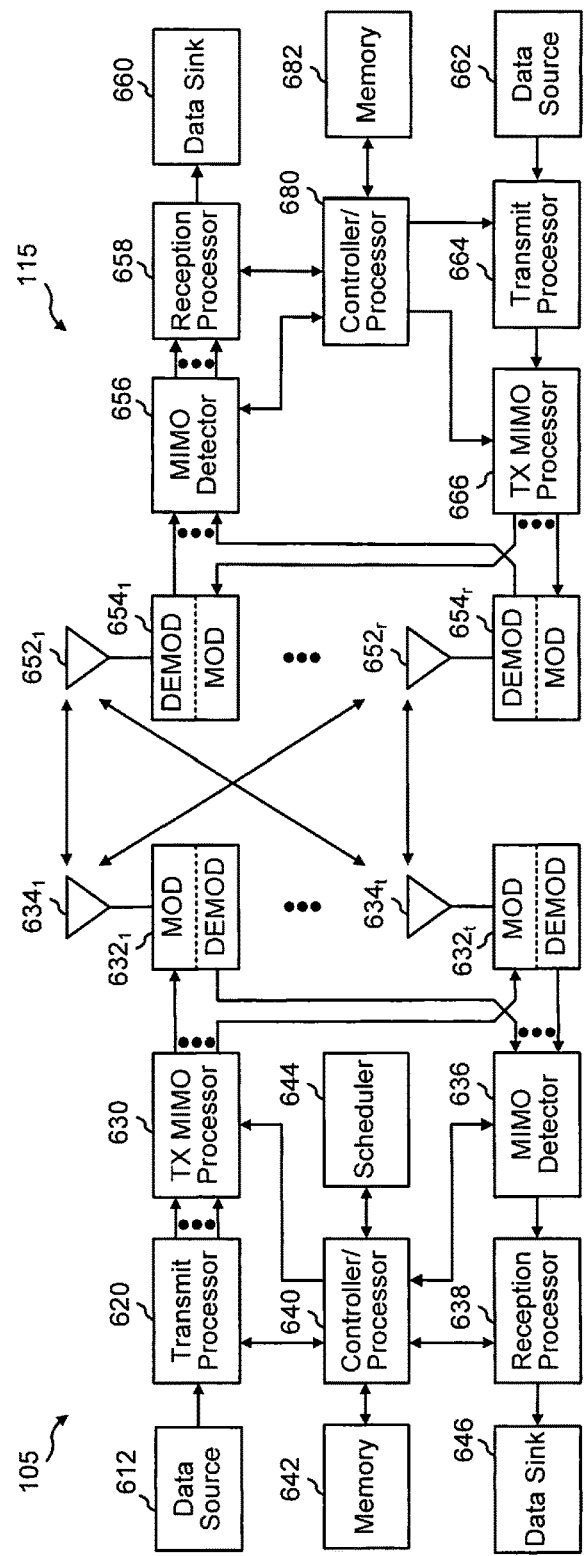
FIG. 6 shows a block diagram of a design of a base station/eNB and a UE, which may be one of the base stations/eNBs and one of the UEs in FIG. 1.

FIG. 6 shows a block diagram of a design of a base station/eNB 105 and a UE 115, which may be one of the base stations/eNBs and one of the UEs in FIG. 1. The eNB 105 may be equipped with antennas 634a through 634t, and the UE 115 may be equipped with antennas 652a through 652r. At the eNB 105, a transmit processor 620 may receive data from a data source 612 and control information from a controller/processor 640. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 620 may process (e.g., encode and symbol map) the data and control information to obtain data symbols and control symbols, respectively. The transmit processor 620 may also generate reference symbols, e.g., for the primary synchronization signal (PSS), secondary synchronization signal (SSS), and cell-specific reference signal. A transmit (TX) multiple-input multiple-output (MIMO) processor 630 may perform spatial processing (e.g., precoding) on the data symbols, the control symbols, and/or the reference symbols, if applicable, and may provide output symbol streams to the modulators (MODs) 632a through 632t. Each modulator 632 may process a respective output symbol stream (e.g., for OFDM, etc.) to obtain an output sample stream. Each modulator 632 may further process (e.g., convert to analog, amplify, filter, and upconvert) the output sample stream to obtain a downlink signal. Downlink signals from modulators 632a through 632t may be transmitted via the antennas 634a through 634t, respectively.

At the UE 115, the antennas 652a through 652r may receive the downlink signals from the eNB 105 and may provide received signals to the demodulators (DEMODs) 654a through 654r, respectively. Each demodulator 654 may condition (e.g., filter, amplify, downconvert, and digitize) a respective received signal to obtain input samples. Each demodulator 654 may further process the input samples (e.g., for OFDM, etc.) to obtain received symbols. A MIMO detector 656 may obtain received symbols from all the demodulators 654a through 654r, perform MIMO detection on the received symbols if applicable, and provide detected symbols. A receive processor 658 may process (e.g., demodulate, deinterleave, and decode) the detected symbols, provide decoded data for the UE 115 to a data sink 660, and provide decoded control information to a controller/processor 680.

On the uplink, at the UE 115, a transmit processor 664 may receive and process data (e.g., for the physical uplink shared channel (PUSCH)) from a data source 662 and control information (e.g., for the physical uplink control channel (PUCCH)) from the controller/processor 680. The transmit processor 664 may also generate reference symbols for a reference signal. The symbols from the transmit processor 664 may be precoded by a TX MIMO processor 666 if applicable, further processed by the demodulators 654a through 654r (e.g., for SC-FDM, etc.), and transmitted to the eNB 105. At the eNB 105, the uplink signals from the UE 115 may be received by the antennas 634, processed by the modulators 632, detected by a MIMO detector 636 if applicable, and further processed by a receive processor 638 to obtain decoded data and control information sent by the UE 115. The processor 638 may provide the decoded data to a data sink 646 and the decoded control information to the controller/processor 640.

The controllers/processors 640 and 680 may direct the operation at the eNB 105 and the UE 115, respectively. The controller/processor 640 and/or other processors and modules at the eNB 105 may perform or direct the execution of various processes for the techniques described herein. The controllers/processor 680 and/or other processors and modules at the UE 115 may also perform or direct the execution of the functional blocks illustrated in FIGS. 8, 10A, 10B, and 12, and/or other processes for the techniques described herein. The memories 642 and 682 may store data and program codes for the eNB 105 and the UE 115, respectively. A scheduler 644 may schedule UEs for data transmission on the downlink and/or uplink.

A device, such as a UE, may have multiple antennas (N) to use for receiving and/or transmitting signals. The device may divide the use and assignment of the antennas to use for particular radio access technologies (RATs), such as LTE, WiFi, etc., for particular carrier frequencies, or both. For example, in a CA scenario, the device may use a fixed number of antennas for one carrier. Conversely, the device may use a fixed number of antennas for WiFi when the device supports both WiFi and other technologies, such as LTE. In one example, a UE may have four antennas and assign two of the antennas for WiFi communication and two antennas for LTE communications. A device, such as a UE, may also dynamically or semi-statically select a number of antennas for one technology or one carrier (antenna selection). In such dynamic or semi-static schemes, the sharing or selection may be triggered by a particular measurement result, such as channel quality indicator (CQI), reference signal receive power (RSRP), and the like.

Communications networks, such as LTE, may have frequency division multiplexing (FDM) implementations and time division multiplexing (TDM) implementations. Sharing options in FDM implementations are not truly sharing different antennas, but rather sharing the frequency spectrum received over the antenna. For example, a UE may use a diplexer/switch in order to use all antennas at the same time for different air-interfaces. The diplexer/switch acts as a filter by filtering out the unwanted frequencies. However, in such FDM sharing schemes, there is typically a considerable loss in signal strength as the signals are filtered. Such losses can also increase with the higher frequency bands. TDM implementations may actually use or assign separate antennas for each air-interface/technology. Thus, when communications over such air-interfaces/technologies are not in use, those antennas that were assigned or designated for the unused communications may be shared with other air-interfaces/technologies. The various aspects of the present disclosure are directed to communication systems using TDM implementations.

In LTE/LTE-A networks with contention-based shared spectrum including unlicensed frequency bands, the downlink and uplink duplexing, in standalone and carrier aggregation modes, are performed using time division duplex (TDD) operations. The LBT radio frame length is fixed to 10 subframes, but it may not be completely aligned with the LTE radio frame. The downlink-uplink configuration (TDD configuration) within this LBT radio frame may be indicated through a common downlink channel, such as a downlink CUBS, the physical frame format indicator channel (PF-FICH), and the like, which precedes the first downlink subframe of LBT frame. A base station may select the particular TDD configuration to signal in the downlink channel depending upon the nature and direction of traffic.

Figure 7:
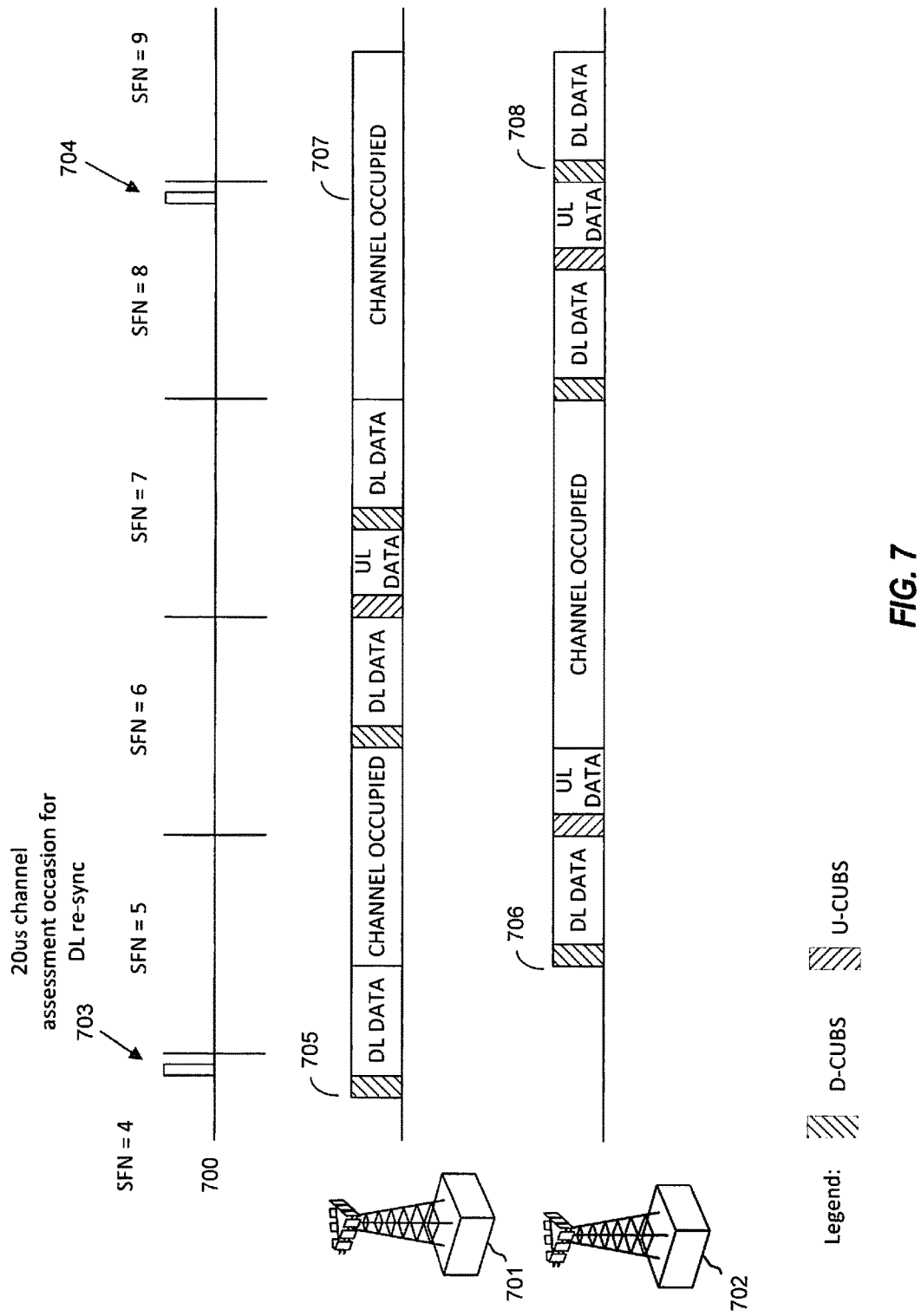
FIG. 7 is a block diagram illustration base stations transmitting on floating LBT frames.

FIG. 7 is a block diagram illustration base stations 701 and 702 transmitting on floating LBT frames. LTE frame 700 identifies the system frame numbers (SFN 4-9, as illustrated). Two resync occasions, resync occasions 703 and 704, are identified for allowing base stations 701 and 702 to synchronize transmissions for concurrently transmitting on the contention-based shared spectrum of LTE frame 700. At each resync occasion, multiple nodes can perform CCA at the same time without experiencing signal energy from each other during CCA operation. In other words, the nodes are not blocked by each other for CCA operation at each resync occasion. Therefore, with the resync operation, multiple nodes can transmit at the same time, achieving better overall system efficiency with a reuse level one. Without resync occasions, different nodes can only transmit in a TDM (time dome multiplex) fashion when they are within an energy detection range of each other. On the other hand, each resync occasion does come with certain system overhead. On each resync occasion, all nodes will stop ongoing transmissions, thus, giving up the medium, and perform a CCA in order to begin transmission again, if the CCA succeeds. However, with floating LBT frames, when base station 701 reserves the channel at time 705, it transmits downlink CUBS along with the downlink channel to reserve the channel and inform served UEs of the downlink-uplink configuration of its LBT frame. Base station 701 then transmits it downlink data. Base station 701, thus, begins its LBT frame at time 705. It will not transmit another downlink CUBS for at least 10 ms over the remaining duration of the LBT frame. Base station 702 reserves the channel at time 706 and, thus, begins its LBT frame at a different location than base station 701. Because the LBT frames of base stations 701 and 702 are out of sync, at resync occasion 704, the channel is occupied by a UE transmitting uplink data to base station 702. Therefore, base station 701 is blocked from attempting to contend for access to the channel at 707 for concurrent communications, when base station 702 transmits downlink CUBS at 708. Without the ability to concurrently transmit on the contention-based channel, the reuse level fall below the target reuse level one, which reduces the capacity and efficiency of the network.

The payload of a PFFICH generally includes three bits, a0, a1, a2. The following TDD configurations presented in Table 1 are provided, where S' and S" are special subframes.

TABLE 1

| Uplink-downlink configuration | PFFICH payload a0, a1 and a2 | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 0 0 0 | D | S" | U | U | U | U | U | U | U | S' |
| 1 | 0 0 1 | D | D | S" | U | U | U | U | U | U | S' |
| 2 | 0 1 0 | D | D | D | S" | U | U | U | U | U | S' |
| 3 | 0 1 1 | D | D | D | D | S" | U | U | U | U | S' |
| 4 | 1 0 0 | D | D | D | D | D | S" | U | U | U | S' |
| 5 | 1 0 1 | D | D | D | D | D | D | S" | U | U | S' |
| 6 | 1 1 0 | D | D | D | D | D | D | D | S" | U | S' |
| 7 | 1 1 1 | D | D | D | D | D | D | D | D | D | S' |

One of the benefits for having the length of the LBT radio frame known at a UE is that, after the downlink CUBS is detected, the UE would not have to perform a continuous search for additional downlink CUBS for the length of LBT radio frame (e.g., for 10 subframes, under the existing design). In existing configurations, when the UE detects downlink CUBS, it will not monitor for another downlink CUBS for the remainder of the LBT frame (e.g., 10 ms). Thus, by knowing the end of the LBT frame, the UE will know when to again monitor for downlink CUBS. This also helps the UE avoid the need for dual detection capability for both enhanced physical downlink shared channel (ePDSCH) and downlink CUBS for the LBT radio frame. In alternate designs, where the base station has the flexibility to send downlink CUBS in any subframe, the UE would likely need such dual detection capabilities, and the UE would likely perform downlink CUBS detection potentially in every subframe. If downlink CUBS is not detected, the UE would likely need to decode the downlink grant in order to be clear whether the base station is transmitting data to the UE.

As illustrated above with respect to FIG. 7, due to the floating nature of the LBT radio frame, multiple base stations, such as base stations 701 and 702, may not achieve downlink resynchronization with each other, thus, losing any network capacity gains that may be obtained with reuse level one operation. A floating LBT frame implies that the LBT frame does not always align with the radio frame. Each eNB, based on the time instance when it gains access to the medium, can transmit data up to the maximum allowed frame length. On the other hand, the fixed LBT frame implies that the LBT frame will always end at subframe 9, regardless of when it starts. The drawback to the fixed LBT frame structure is that the overhead could be large, especially when an eNB is only able to access the medium after subframe 0 due to nearby interference. The eNB also cannot adjust the LBT frame length based on the traffic load. In contrast, a floating LBT frame allows the eNB to maximize the medium occupancy for each instance where it gains access to the medium. It further allows an eNB to adjust the LBT frame length based on the traffic load. However, with floating LBT, eNBs may not always be in sync, as different eNBs could have different LBT frame lengths due to different traffic patterns or different local interference situations even though these eNBs could have been synchronous at the beginning of medium access. Communications systems that employ a reuse level one operation, where all the cells use the same frequency, are designed to provide the highest network efficiency and enable high data rates close to the base station.

Figure 8:
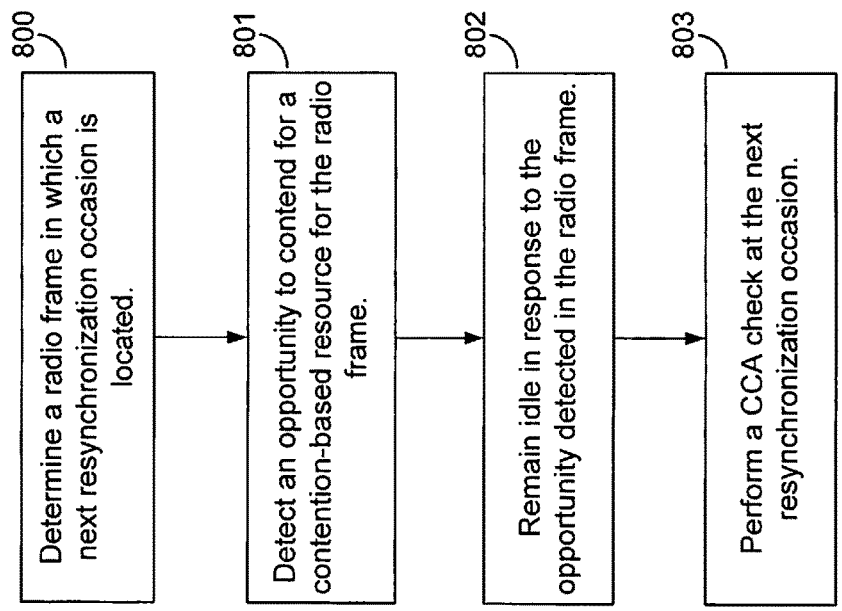
FIG. 8 is a block diagram illustrating example blocks executed to implement one aspect of the present disclosure.
Figure 9:
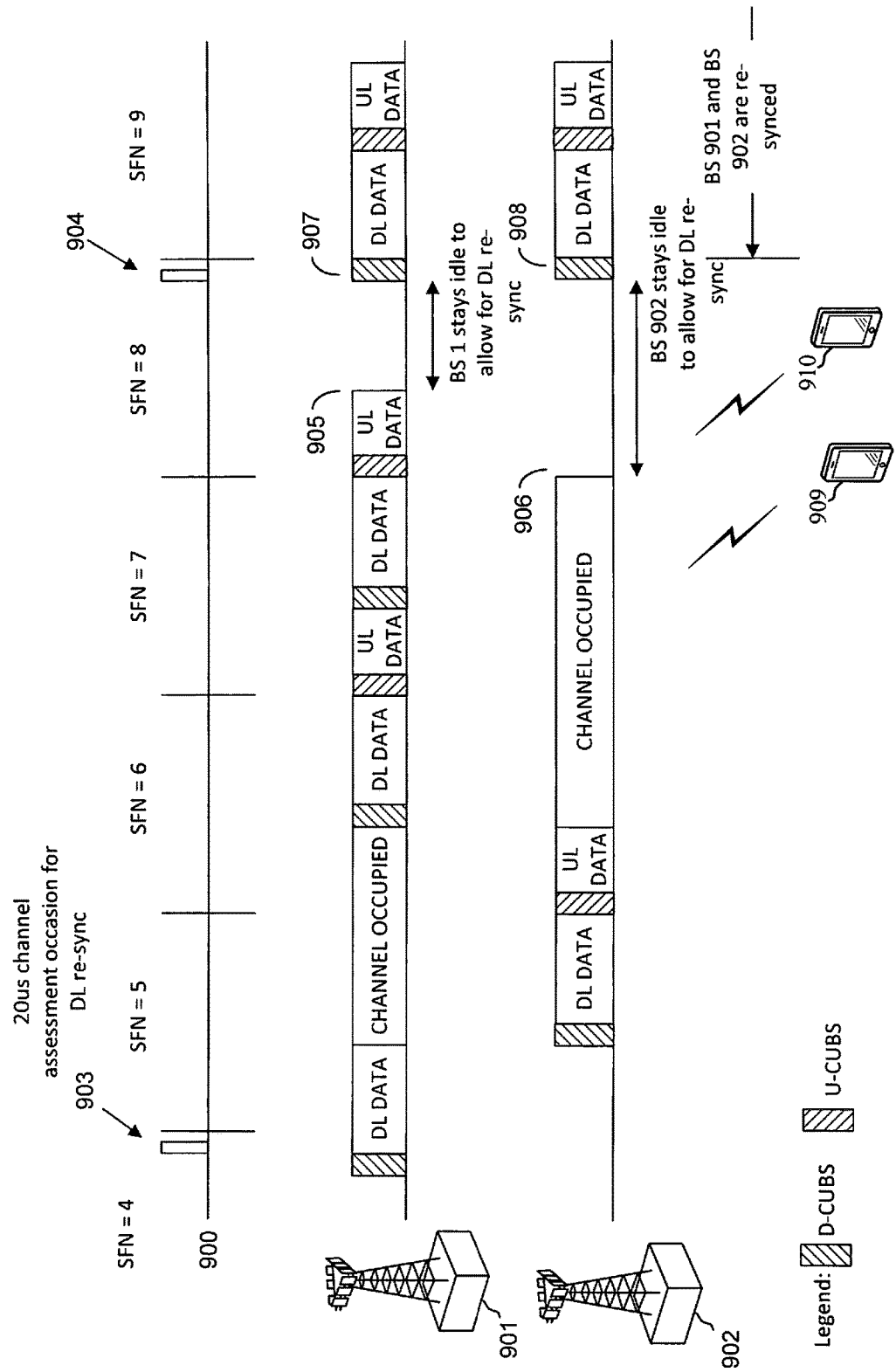
FIG. 9 is a block diagram illustrating base stations and UEs configured according to one aspect of the present disclosure.

FIG. 8 is a block diagram illustrating example blocks executed to implement one aspect of the present disclosure. The blocks illustrated in FIG. 8 will be further described with respect to the components and actions illustrated in FIG. 9. FIG. 9 is a block diagram illustrating base stations 901 and 902 and UEs 909 and 910 configured according to one aspect of the present disclosure. Base stations 901 and 902 serve two cells within a communication system having contention-based shared spectrum including unlicensed frequency bands. Base stations 901 and 902 serve communications for UEs 909 and 910, which transmit the uplink signals and uplink CUBS represented in the communication timelines of base stations 901 and 902 in relation to system time line 900.

At block 800, a base station, such as base stations 901 and 902, determines the radio frame in which the next resynchronization occasion is located. For example, base stations 901 and 902 determine that the next resync occasion is located at resync occasion 904, at the end of system frame number (SFN) 8. In this example, resync occasions 903 and 904 occur periodically at an interval of 40 ms in radio frames with a system frame number (SFN) of system timeline 900 that is a multiple of 4.

At block 801, the base station detects an opportunity to contend for the contention-based resource for the radio frame with the resync occasion. For example, base stations 901 and 902 both have full buffer data, in downlink and uplink. However, due to the floating nature of LBT radio frames and the fixed length of LBT radio frame (e.g., length=10 subframes), there may be no deterministic way to ensure that both of base stations 901 and 902 relinquish the shared medium before resync occasion 904.

At block 802, the base station determines to remain idle in response to the opportunity detected in the radio frame. When a base station, such as base stations 901 and 902 transmit downlink CUBS to reserve the channel, the UEs detecting such downlink CUBS will not monitor for another downlink CUBS until the end of the next LBT frame, 10 ms. Accordingly, in order to ensure that transmissions at either of base stations 901 and 902 would be completed before resync occasion 904, base stations 901 and 902 remain idle at 905 and 906, respectively, in response to the opportunity to contend for the shared resource falling within a full 10 ms LBT frame of resync opportunity 904. If base station 901 were to contend for the shared resource at time 905 or base station 902 were to content for the shared resource at time 906, neither LBT frame would be complete before resync opportunity 904. Moreover, because the two LBT frames are not aligned, transmissions from one of base stations 901 and 902 may block a CCA check for access by the other. Therefore, by remaining idle at 905 and 906 for the system frame of resync opportunity 904, each of base stations 901 and 902 will be available at resync opportunity 904.

At block 803, the base station performs a CCA check at the next resync occasion to reserve access to the contention-based shared resource. For example, after remaining idle for all or part of SFN 8, both of base stations 901 and 902 are available to concurrently perform a CCA check at resync opportunity 904. The concurrent CCA check will allow both base stations 901 and 902 to reserve the shared channel by transmitting downlink CUBS at 907 and 908, respectively, and occupy the resource concurrently, thus, increasing the capacity, data rates, and efficiency to a reuse level one. Reuse level one operation typically has a higher overall system capacity as all nodes can transmit at the same time, while TDM transmission across nodes only allows one node to transmit while the other nodes remain silent if they are within an energy detection range of the transmitting node. Reuse level one systems may, therefore, have a lower signal to noise plus interference ratio (SINR) distribution even though more nodes can transmit simultaneously, while TDM systems may have a higher SINR distribution even though only one node can transmit within an energy detection range. However, because the system capacity is linear from a time and bandwidth perspective, while it is only logarithmic with respect to SINR, reuse level one systems may achieve higher system capacity than TDM systems.

Aspects of the disclosure, as illustrated and described with respect to FIGS. 8 and 9, are configured to employ base station idling before resync occasions and may provide a higher probability to obtain base station resynchronization. However, in a worst case scenario, such base stations may be idle for up to 10 subframes, which may result in a substantial loss of channel capacity. Moreover, some jurisdictions allow a maximum time for all transmitter operations (e.g., Japan limits all transmitter operations for either base station or UE to 4 ms). With a 10 ms LBT frame length, both the base station and UE may end up wasting the shared resource as each would only be allowed to maintain any one transmission up to 4 ms. Even considering an equal downlink-uplink division in the frame, substantial capacity is lost. In such cases, a flexible frame length that is not limited to 10 ms could be allowed to mitigate against such losses. Additionally, resource utilization could be optimized more effectively instead of allowing base stations to remain idle in downlink or S" subframes, or to allow UEs to remain idle in uplink or S' subframes.

Various additional aspects of the present disclosure provide for mitigating the inter-base station resynchronization loss described above by providing for a flexible LBT frame length. In a first example aspect with flexible LBT frames, LBT frame length may be changed without explicitly signaling the downlink-uplink subframe configuration to the UEs. In this additional aspect, a base station is allowed to dynamically change the length of the LBT frame. The base station would then substitute the bits used to signal the downlink-uplink configuration in a downlink control channel in order to signal the LBT frame length value.

Figures 10A, 10B:
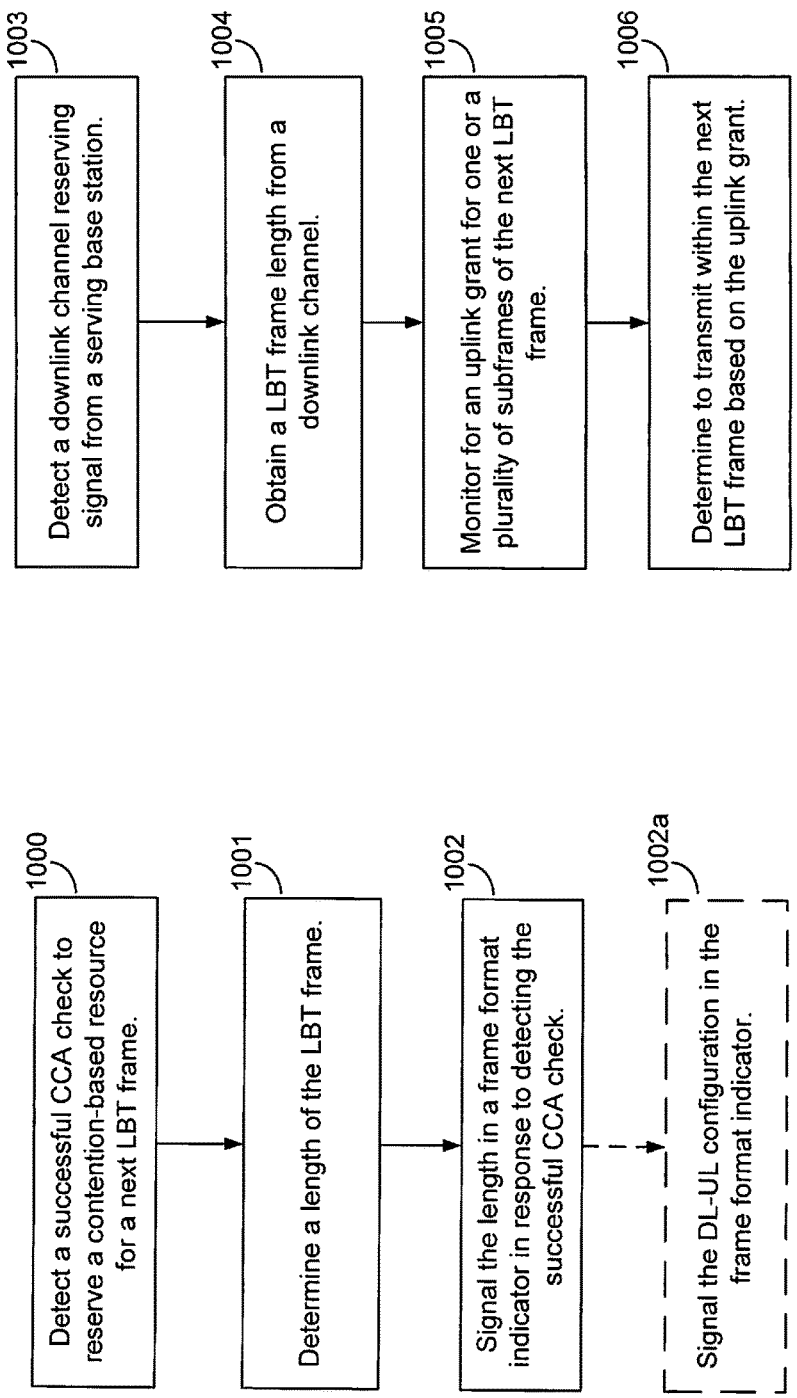
FIGS. 10A and 10B are block diagrams illustrating example blocks executed to implement aspects of the present disclosure.
Figure 11:
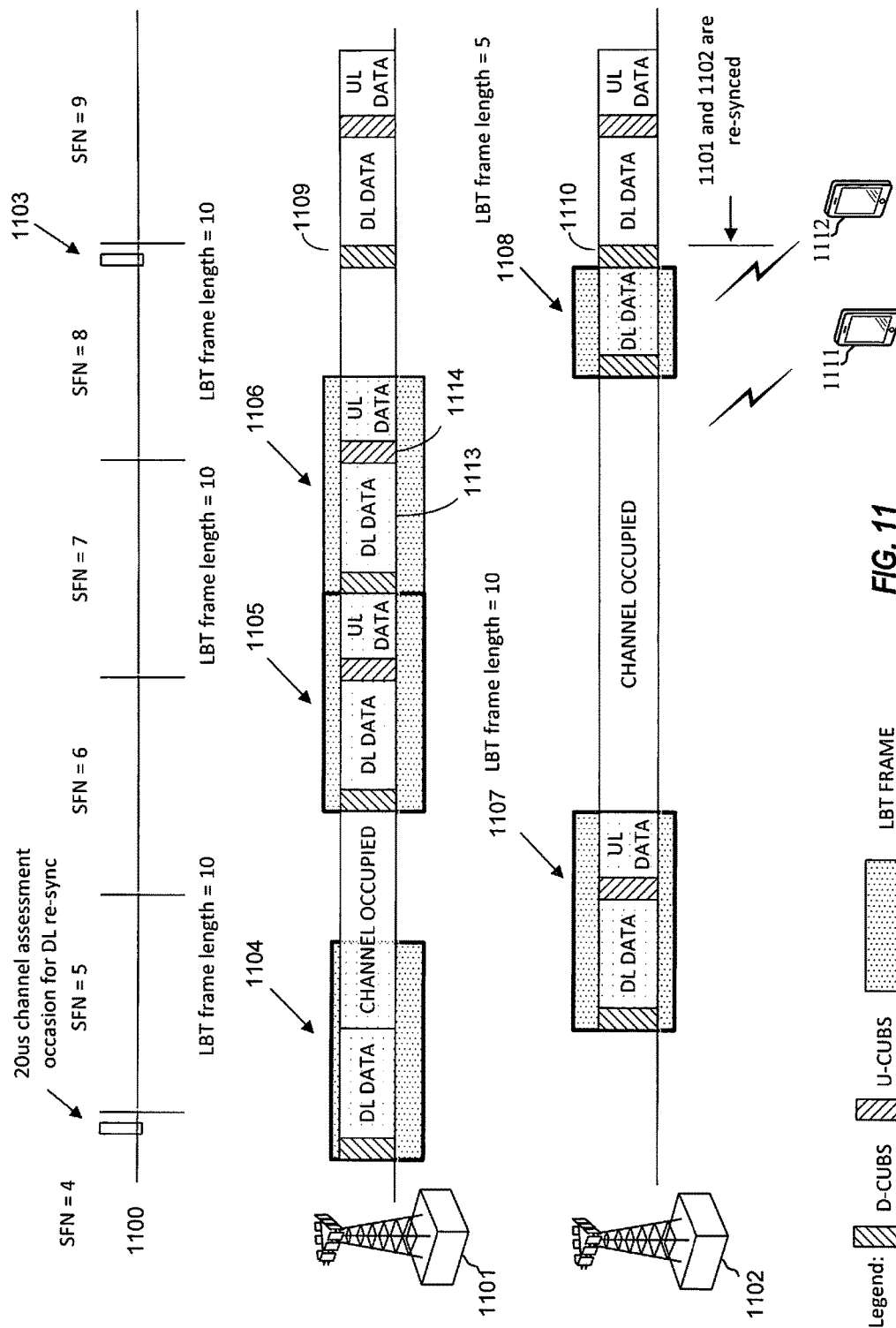
FIG. 11 is a block diagram illustrating base stations and UEs configured according to one aspect of the present disclosure.

FIGS. 10A and 10B are block diagrams illustrating example blocks executed to implement aspects of the present disclosure. FIG. 10A presents blocks executed at an example base station, while FIG. 10B presents blocks executed at an example UE. The blocks described with respect to FIGS. 10A and 10B will also be described with reference to the components and acts illustrated in FIG. 11. FIG. 11 is a block diagram illustrating base stations 1101 and 1102 and UEs 1111 and 1112 configured according to one aspect of the present disclosure. Base stations 1101 and 1102 serve two cells within a communication system having contention-based shared spectrum including unlicensed frequency bands. Base stations 1101 and 1102 serve communications for UEs 1111 and 1112, which transmit the uplink signals and uplink CUBS represented in the communication timelines of base stations 1101 and 1102 in relation to system time line 1100.

After detecting a successful CCA check, base stations 1101 and 1102 would transmit downlink CUBS to reserve the contention-based shared resource. In addition to the downlink CUBS, base stations 1101 and 1102 would transmit a downlink control channel which includes the LBT frame length indicator. For example, in LBT frames 1104-1107, base stations 1101 and 1102 would also transmit a downlink control channel with an identifier identify the next LBT frame length of 10 ms.

At block 1000, a base station, such as base stations 1101 and 1102, detects a successful CCA check to reserve the contention-based shared resource for the next LBT frame. As described above, base stations 1101 and 1102 have conducted successful CCA checks for LBT frames 1104-1107. However, in such instances, there was no need to modify the length of the LBT frame.

At block 1001, the base station determines to modify a length of the LBT frame. In this example, when base station 1102 transmits downlink CUBS after the successful CCA check in SFN 8, it determines that a standard LBT frame would extend beyond resync occasion 1103. Accordingly, base station 1102 would determine to modify the length of the LBT frame.

At block 1002, the base station signals the length in a frame format indicator in response to detecting the successful CCA for SFN 8. For example, base station 1102, after detecting the successful CCA check at the beginning of LBT frame 1108, transmits a downlink control channel to UEs 1111 and 1112 including an indicator that indicates a LBT frame length of 5 ms. Base station 1102 would conduct the communications during the shortened LBT frame and be available, at resync opportunity 1103, to concurrently perform a CCA check at 1110 with base station 1101 at 1109. After detecting the successful CCA at base stations 1101 and 1102, the shared channel is jointly reserved by transmitting downlink CUBS at 1109 and 1110, respectively. Thus, base stations 1101 and 1102 become resynchronized on the contention-based shared resource.

Referring now to FIG. 10B, at block 1003, the UE, such as UEs 1111 and 1112, detect a downlink channel reserving signal from a serving base station. For example, UEs 1111 and/or 1112 detects the downlink CUBS at the beginning of shortened LBT frame 1108.

At block 1004, the UE obtains an LBT frame length from a downlink channel. Along with the downlink CUBS at the beginning of LBT frame 1108, base station 1102 transmits a downlink control channel that substitutes the bits that were previously used to transmit the downlink-uplink subframe configuration with bits that identify the LBT frame length. The LBT frame length is used by the UE, such as UEs 1111 and 1112, to determine the length of the downlink portion of the next LBT frame.

Table 2 provides an example mapping for a 3-bit value of a PFFICH payload that indicates the corresponding LBT frame length.

TABLE 2

| PFFICH payload a0, a1 and a2 | LBT frame length |
|---|---|
| 0 0 0 | 3 |
| 0 0 1 | 4 |
| 0 1 0 | 5 |
| 0 1 1 | 6 |
| 1 0 0 | 7 |
| 1 0 1 | 8 |
| 1 1 0 | 9 |
| 1 1 1 | 10 |

At block 1005, the UE monitors for an uplink grant from the serving base station in each of the subframes of the current LBT frame and determines, at block 1006, to transmit on at least one subframe in the LBT frame based on the uplink grant. Since the downlink-uplink TDD configuration is not explicitly provided to UE, such as UEs 1111 and 1112, in the presently described aspect, the UE will determine the uplink subframe occasions within a LBT radio frame based on the uplink grants. The grants could be the uplink grants to schedule the uplink data transmission on ePUSCH. The grants could also be the group acknowledgement (ACK) grants to trigger UE transmission on ePUCCH. Once the UE detects the uplink grants, the UE is able to determine when an uplink subframe occurs and could stop monitoring downlink transmissions until the end of the current LBT frame as indicated by a downlink control channel. For example, upon obtaining the LBT frame length of 5 ms from a downlink control channel of base station 1102 in LBT frame 1108, UE 1111 begins to monitor each subframe of LBT frame 1108 for uplink grants (e.g., grants for ePUSCH or ePUCCH, and the like). However, because there are no uplink grants in LBT frame 1108, UE 1111 will not determine to transmit on any of the subframes in LBT frame 1108.

In contrast, after receiving the downlink control channel with the LBT frame length indicator of 10 ms for LBT frame 1106, UE 1112 begins to monitor for uplink grants. In another example with LAA (license assisted access), UE 1111 could monitor for an uplink grant from the primary carrier with cross carrier signaling. UE 1112 detects such an uplink grant in a downlink subframe at 1113 and assumes that uplink subframes begin at 1114 and continue to the end of LBT frame 1106. UE 1112 would then determine to transmit uplink CUBS at 1114 after detecting a successful CCA check just prior thereto. After the successful CCA check, UE 1112 would transmit its uplink data and then refrain from transmitting in the remaining subframes of LBT frame 1106. The refraining from transmission by UE 1112 may include simply remaining idle or waiting until the next LBT frame, or may also include actively monitoring for further uplink grants or other instructions from a serving base station.

Tables 3-10, as follows, indicate the possible downlink-uplink subframe ratios that the base station can choose to use for each of the LBT frame lengths.

TABLE 3

| PFFICH payload | Subframe number | | | | | | | | | |
|---|---|---|---|---|---|---|---|---|---|---|
| a0, a1 and a2 | 0 | 1 | 2 | 3 | 4 | 5 | 6 | 7 | 8 | 9 |
| 0 0 0 | D | D | S' | — | — | — | — | — | — | — |

TABLE 4

| PFFICH payload | Subframe number | | | | | | | | | |
|---|---|---|---|---|---|---|---|---|---|---|
| a0, a1 and a2 | 0 | 1 | 2 | 3 | 4 | 5 | 6 | 7 | 8 | 9 |
| 0 0 1 | D | D | D | S' | — | — | — | — | — | — |
| 0 0 1 | D | S" | U | S' | | | | | | |

TABLE 5

| PFFICH payload | Subframe number | | | | | | | | | |
|---|---|---|---|---|---|---|---|---|---|---|
| a0, a1 and a2 | 0 | 1 | 2 | 3 | 4 | 5 | 6 | 7 | 8 | 9 |
| 0 1 0 | D | D | D | D | S' | — | — | — | — | — |
| 0 1 0 | D | D | S" | U | S' | — | — | — | — | — |
| 0 1 0 | D | S" | U | U | S' | — | — | — | — | — |

TABLE 6

| PFFICH payload | Subframe number | | | | | | | | | |
|---|---|---|---|---|---|---|---|---|---|---|
| a0, a1 and a2 | 0 | 1 | 2 | 3 | 4 | 5 | 6 | 7 | 8 | 9 |
| 0 1 1 | D | D | D | D | D | S' | — | — | — | — |
| 0 1 1 | D | D | D | S" | U | S' | — | — | — | — |
| 0 1 1 | D | D | S" | U | U | S' | — | — | — | — |
| 0 1 1 | D | S" | U | U | U | S' | — | — | — | — |

TABLE 7

| PFFICH payload | Subframe number | | | | | | | | | |
|---|---|---|---|---|---|---|---|---|---|---|
| a0, a1 and a2 | 0 | 1 | 2 | 3 | 4 | 5 | 6 | 7 | 8 | 9 |
| 1 0 0 | D | D | D | D | D | D | S' | — | — | — |
| 1 0 0 | D | D | D | D | S' | U | S" | — | — | — |
| 1 0 0 | D | D | D | S' | U | U | S" | — | — | — |
| 1 0 0 | D | D | S' | U | U | U | S" | — | — | — |
| 1 0 0 | D | S' | U | U | U | U | S" | — | — | — |

TABLE 8

| PFFICH payload | Subframe number | | | | | | | | | |
|---|---|---|---|---|---|---|---|---|---|---|
| a0, a1 and a2 | 0 | 1 | 2 | 3 | 4 | 5 | 6 | 7 | 8 | 9 |
| 1 0 1 | D | D | D | D | D | D | D | S' | — | — |
| 1 0 1 | D | D | D | D | D | S" | U | S' | — | — |
| 1 0 1 | D | D | D | D | S" | U | U | S' | — | — |
| 1 0 1 | D | D | D | S" | U | U | U | S' | — | — |
| 1 0 1 | D | D | S" | U | U | U | U | S' | — | — |
| 1 0 1 | D | S" | U | U | U | U | U | S' | — | — |

TABLE 9

| PFFICH payload | Subframe number | | | | | | | | | |
|---|---|---|---|---|---|---|---|---|---|---|
| a0, a1 and a2 | 0 | 1 | 2 | 3 | 4 | 5 | 6 | 7 | 8 | 9 |
| 1 1 0 | D | D | D | D | D | D | D | D | S' | — |
| 1 1 0 | D | D | D | D | D | D | S" | U | S' | — |
| 1 1 0 | D | D | D | D | D | S" | U | U | S' | — |
| 1 1 0 | D | D | D | D | S" | U | U | U | S' | — |
| 1 1 0 | D | D | D | S" | U | U | U | U | S' | — |
| 1 1 0 | D | D | S" | U | U | U | U | U | S' | — |
| 1 1 0 | D | S" | U | U | U | U | U | U | S' | — |

TABLE 10

| PFFICH payload | Subframe number | | | | | | | | | |
|---|---|---|---|---|---|---|---|---|---|---|
| a0, a1 and a2 | 0 | 1 | 2 | 3 | 4 | 5 | 6 | 7 | 8 | 9 |
| 1 1 1 | D | D | D | D | D | D | D | D | D | S' |
| 1 1 1 | D | D | D | D | D | D | D | S" | U | S' |
| 1 1 1 | D | D | D | D | D | D | S" | U | U | S' |
| 1 1 1 | D | D | D | D | D | S" | U | U | U | S' |
| 1 1 1 | D | D | D | D | S" | U | U | U | U | S' |
| 1 1 1 | D | D | D | S" | U | U | U | U | U | S' |
| 1 1 1 | D | D | S" | U | U | U | U | U | U | S' |
| 1 1 1 | D | S" | U | U | U | U | U | U | U | S' |

Allowing the base station to indicate the LBT frame length may also facilitate operation of LTE/LTE-A networks with contention-based shared spectrum in regions where there may be constraints on the maximum allowed transmission operation time, as noted above. In such aspects, base stations, such as base stations 1101 and 1102 would be able to dynamically reduce the LBT frame length in order to more efficiently accommodate the reduced transmission operation time.

In such example aspects of the present disclosure, the UE, such as UEs 1111 and 1112, will not know the downlink-uplink configuration for the current LBT frame. This may have an unwanted effect on other communication procedures. For example, existing enhanced physical random access channel (ePRACH) procedures provide for the UE to transmit ePRACH in the first uplink subframe of the frame. Without knowledge of the downlink-uplink configuration, UEs 1111 and 1112 would not know the first uplink subframe for initiating the ePRACH procedure.

Various solutions may be employed to address this issue for ePRACH. In one example solution, a type 2 ePRACH may be used by UEs 1111 and 1112. LTE/LTE-A networks with contention-based shared spectrum, which operate using LBT procedures for securing access to the contention-based spectrum, do not have guaranteed transmissions in such contention-based spectrum outside of CCA-exempt transmission (CET) occasions. As such, the existing ePRACH procedures may not allow efficient random access procedures. In response to such inefficiencies, solutions have been discussed to provide multiple types of ePRACH occasions. For example, the existing ePRACH procedure, when an LBT frame is detected by UE 1111 or 1112, is referred to as a type 1 ePRACH. UE 1111 or 1112 may send a type 1 ePRACH in the first uplink subframe, as noted above. However, when UEs 1111 or 1112 cannot detect an LBT frame, a type 2 ePRACH procedure may be used, in which UEs 1111 and/or 1112 will send ePRACH in a periodic ePRACH occasion that has been pre-scheduled according to a predetermined periodicity that may be communicated to UEs 1111-1112 served by one of serving base stations 1101 and 1102 through various system broadcast messages. In another possible solution, UEs 1101 and 1102 could use the last subframe, if it is an uplink subframe given the allowable downlink-uplink ratio, to perform type 1 ePRACH reporting.

Several observations can be made in the aspects of the present disclosure in which a UE, such as UEs 1111 and 1112, will not know the downlink-uplink configuration due to the LBT frame length being included in a downlink control channel. For license assisted access (LAA) modes of LTE/LTE-A networks with contention-based shared spectrum, cross-carrier signaling may be used in which UE 1111 or 1112 will monitor PDCCH on the primary component carrier (PCC). When UE 1111 or 1112 detects an uplink grant in subframe n, UE 1111 and 1112 can assume uplink subframes beginning at subframe n+4 until the end of a downlink control channel period, such as the PFFICH period. For self-scheduling scenarios, such as in a stand-alone mode of communication systems having contention-based spectrum with unlicensed frequency band, with an n+4 timeline, UE 1111 and 1112 can assume that the first 4 subframes will always be configured for downlink. As with the cross-carrier signaling aspect, when either UE 1111 or 1112 detects the uplink grant sent in subframe n, UE 1111 or 1112 can assume uplink subframes beginning at subframe n+4 until the end of the downlink control channel period. If no uplink grants are detected, then UE 1111 or 1112 can switch to idle mode until the end of the downlink control channel period.

It should be noted that the assumption of the beginning of the uplink frames based on detecting an uplink grant at subframe n may be at any subsequent subframe where a response to an uplink grant is known to begin. Thus, aspects of the present disclosure may assume uplink subframes begin at subframe n+k, where k is an associated time line for response of uplink transmission from uplink grant The resync boundary on an uplink does not differentiate between special subframe S" and regular uplink subframes. Therefore, without knowing the downlink-uplink configuration, the UE can always assume that the resync boundary will be the guaranteed CUBS boundary prior to the next uplink subframe. The guaranteed CUBS boundary is the minimum duration of CUBS that could be transmitted on a subframe before any uplink channels (e.g., ePRACH, ePUCCH, ePUSCH, and the like) are transmitted on the next uplink subframe.

The channel state information reference signal (CSI-RS) is configured based on radio frame timing. Therefore, because the LBT frame may not be aligned with the LTE system frame, either the base station makes sure that CSI-RS falls into a downlink subframe or the UE performs blind detection to determine whether CSI-RS is being transmitted. More specifically, based on a CSI-RS subframe configuration, a UE, such as UEs 1111 or 1112 can look for potential presence of CSI-RS transmitted from a base station, such as base stations 1101 and 1102, in the configured CSI-RS subframes. However, if CSI-RS subframes fall into uplink subframes, then CSI-RS cannot be transmitted. In this case, the UE could perform blind detection to determine the presence of CSI-RS in the configured CSI-RS subframes and only use CSI-RS for CSI feedback if present.

One issue to consider with the various aspects in which the UE does not know the downlink-uplink configuration is that the UE cannot go to sleep on the uplink subframes when it does not detect any downlink or uplink grants in the downlink subframes. When no such grants are detected, the UE will keep monitoring the remaining subframes for the downlink-uplink grants. However, this issue could be alleviated through the discontinuous reception (DRX) configuration. More specifically, a UE, such as UEs 1101 or 1102, could be configured in DRX mode where it does not monitor downlink CUBS/downlink control channel or any grants in the DRX off period. In the DRX on duration, without knowing the uplink subframes explicitly from a downlink control channel could result in the UE monitoring for grants more often than if the UE had the knowledge of the uplink subframes explicitly from a downlink control channel.

Additional aspects of the present disclosure are directed to a flexible LBT frame length with explicit signaling of the downlink-uplink configuration. In this example aspect, a base station is allowed to dynamically change the length of LBT frame, while the downlink control channel is configured to carry an indication from the base station of both the LBT frame length and the downlink-uplink configuration. Referring back to FIG. 10A, the additional aspect of the present disclosure is represented by alternative block 1002a. In alternative block 1002a, the base station also signals downlink-uplink configuration in the frame format indicator. In order to accommodate the explicit signaling of both LBT frame length and downlink-uplink configuration, the downlink control channel payload may be increased to accommodate the additional information. For example, the current PFFICH payload for downlink-uplink configuration is 3 bits. This payload may be increased to various levels, 5, 6, 8, 10, and the like. An increase to a greater number of bits would allow for signaling all possible configurations, such as presented in Tables 3-10. However, in order to accommodate an increase of a smaller number of bits, some of the example configurations may be dropped.

length (e.g., 2 ms) or an even larger LBT frame length (e.g., 11 ms, 12 ms, 13 ms, etc.) with different downlink-uplink divisions can be supported with a potentially different payload of PFFICH.

This approach allows the base station to dynamically change the PFFICH duration instead of relying on fixed 10 ms duration. Thus, the base station may dynamically change a downlink control channel duration for resynchronization based on the resync occasion. Moreover, because the UE will know the downlink-uplink configuration, the UE may potentially save power by going to sleep if no downlink or uplink grants are received during the downlink subframes.

With the added payload of the downlink control channel, the coding scheme may also be updated in order to accommodate the higher payload. In one example aspect, a circular buffer rate matching code may be used for coding the higher payload of a downlink control channel. One example of a circular buffer rate matching code is the RM (32, O) code, as defined in TS 36.212. RM (32, O) coding is merely one exemplary coding scheme with the 6-bit downlink control channel payload. With a different downlink control channel payload, a different coding scheme can be applied. For example, a (7,3) hamming code with 3-bit payload may also be used. If the payload is 4, RM (20, O) code may be used. For a downlink control channel payload size beyond 4, RM (32, O) code may be used. The coding with the RM (32, O) code further provides flexibility to increase the payload even higher than 6 bits in order to accommodate an LBT frame length greater than 10 ms. Table 11 below provides the basis sequences for (32, O) code.

TABLE 11

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 1 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

It should be noted that Tables 3-10 only list the LBT frame length from 3 to 10 ms. However, these are merely exemplary numbers. The LBT frame length is not necessarily limited to between 3 and 10 ms. An even smaller LBT frame Where M represents the generator matrix with $M_{i,j}$ representing the $j^{th}$ column of the generator matrix. With the increased payload, the number of resource elements (REs) allocated for the downlink control channel may also be increased to maintain a similar code rate as with the lower payloads. A 6 bit payload may be accommodated with 48 REs in order to achieve a code rate as low as 6/48/2=1/16.

Additional aspects of the present disclosure are directed to a base station providing an indication of the resync boundary or downlink CUBS monitoring reset to UE. In this aspect, no change to the downlink control channel is needed, including either re-interpretation or adding more bits to the downlink control channel payload. Instead, the base station signals a downlink CUBS monitoring reset to UE. The downlink CUBS monitoring reset occurs at the resync boundary. Ordinarily, as noted above, a UE will monitor for downlink CUBS once over the duration of a 10 ms LBT frame. Once the downlink CUBS is detected, the UE would not monitor for the downlink CUBS again until the next LBT frame, after 10 ms. In the presently described aspect, a base station may send a downlink CUBS monitoring reset to a UE prior to a next resync occasion. Once received by the UE, the UE will monitor for a downlink CUBS on the last symbol before the resync boundary regardless of whether the UE has detected the downlink CUBS previously within the 10 ms LBT frame. The LBT frame length is, thus, truncated to the resync boundary.

Figure 12:
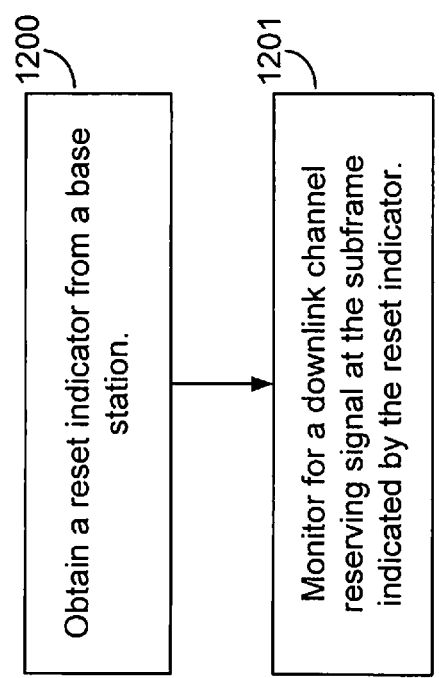
FIG. 12 is a block diagram illustrating example blocks executed to implement one aspect of the present disclosure.

FIG. 12 is a block diagram illustrating example blocks executed to implement one aspect of the present disclosure. At block 1200, a UE, such as UE 115, obtains a reset indicator from a base station. A base station determines the next resync boundary in the LBT frame and transmits the reset indicator to UEs served by the base station. The reset indicator may be broadcast in a system broadcast message or may be transmitted in a UE-specific transmission.

At block 1201, the UE monitors for a downlink channel reserving signal at the subframe indicated by the reset indicator. The UE monitors the last symbol before the resync boundary, as identified by the reset indicator, for downlink CUBS. The UE will monitor for the downlink CUBS regardless of whether it had detected a downlink CUBS within the last LBT frame.

In one example aspect, the base station may broadcast the reset indicator to the UEs using a system broadcast message. With this example aspect, the required change is to adding the resync boundary or downlink CUBS monitoring reset indication from base station to the UE and downlink CUBS task needs to be reset on the resync boundary. This approach does not allow for flexible LBT frame length within the resync boundary as the other two approaches. In this example aspect both the UE and base station continue to apply the 10 ms LBT frame length. However, it does allow for flexible LBT frame length right before the resync boundary.

In the previous aspects, in which the downlink control channel indicates the LBT frame length, the UE obtains an explicit signal identifying the actual LBT frame length. Thus, LBT frame length may vary from one LBT frame to another, in such previous aspects. However, in the currently described aspect, the base station and UE still apply a 10 ms frame duration to each LBT frame. However, at resync boundary, the UE will start monitoring for downlink CUBS/downlink control channel again even within the 10 ms LBT frame duration, thereby, effectively applying a shorter LBT frame length if the LBT frame was not already scheduled to complete at the resync boundary. Moreover, the downlink-uplink division becomes the truncated downlink-uplink division that has occurred by the resync boundary, if the LBT frame is not complete upon resync boundary.

If the reset indicator is set at a frequent periodicity (e.g., once every 10 ms), even though it allows the base station to effectively change the LBT frame via the reset indicator, because the LBT frame is floating based on when the base station performs the CCA check, an LBT frame may be truncated unnecessarily, and the UE will end up monitoring for downlink CUBS more often. Moreover, each time base stations perform a resync operation, there is a certain associated channel capacity loss as all network nodes (e.g., base stations and UEs) will release the channel for the base station to perform eCCA/CCA. Because of this condition, a base station will typically not want to configure the reset indicator as often as per radio frame. In operations of the design with a fixed LBT frame, the base stations effectively resync once every radio frame at the last subframe of the frame, and UE starts monitoring for downlink CUBS at this last subframe of the frame. The fixed LBT design, however, is less efficient with medium usage compared to the floating LBT frame structure because of the overhead used with resync operations every radio frame.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 8, 10A, 10B, and 12 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    detecting a downlink channel reserving signal from a serving base station;
    obtaining a listen before talk (LBT) frame length from a downlink channel with the downlink channel reserving signal, wherein the LBT frame length identifies a length of a downlink portion of a next LBT frame;
    monitoring for an uplink grant for one or a plurality of subframes of the next LBT frame; and
    determining to transmit on at least one subframe within the next LBT frame based on the uplink grant.

2. The method of claim 1, further including:
    performing a clear channel assessment (CCA) check of a contention-based shared resource in response to the uplink grant and having uplink data for transmission;
    transmitting the uplink data in response to the CCA check being successful; and
    refraining from transmitting in one or more remaining subframes of the next LBT frame after the transmitting.

3. The method of claim 2, further including:
    determining whether the CCA check is successful prior to a guaranteed channel reserving signal boundary, wherein the guaranteed channel reserving signal boundary includes a minimum duration of one or more channel reserving signals transmitted before uplink transmission on a next uplink subframe; and
    transmitting the one or more channel reserving signals beginning at the guaranteed channel reserving signal boundary in response to determining the CCA check is successful prior to the guaranteed channel reserving signal boundary, wherein the transmitting the uplink data is further in response to completion of the one or more channel reserving signals.

4. The method of claim 1, further including:
    detecting a user equipment (UE) status triggering a random access procedure; and
    sending a random access message after a successful clear channel assessment (CCA) check in response to one of:
        a last subframe of the next LBT frame when the uplink grant is detected; or
        a next periodic random access occasion, wherein a periodicity of the next periodic random access occasion is obtained from a system broadcast message.

5. The method of claim 1,
    wherein the monitoring for the uplink grant includes:
        monitoring a downlink control channel on a primary component carrier of a non-contention-based frequency band, and
    wherein the determining to transmit includes:
        detecting the uplink grant in subframe n; and
        beginning to monitor for a next channel reserving signal after subframe n+k, where k is an associated time line for response of uplink transmission from uplink grant.

6. The method of claim 1,
    wherein the determining to transmit includes:
        detecting the uplink grant in subframe n; and
        assuming the next LBT frame continues until subframe n+k, where k is an associated time line for response of uplink transmission from uplink grant.

7. The method of claim 1, further including:
receiving a signal from the serving base station; and
blind decoding the signal to determine one or more of:
a subframe during which the signal is received is a downlink subframe; and
the signal includes a channel state information reference signal (CSI-RS).

8. The method of claim 1, further including:
obtaining a downlink-uplink configuration from the next LBT frame in the frame format indicator transmitted with the downlink channel reserving signal, wherein the downlink-uplink configuration identifies a division of the plurality of subframes between downlink, uplink, and special subframes.

9. An apparatus configured for wireless communication, the apparatus comprising:
at least one processor; and
a memory coupled to the at least one processor,
wherein the at least one processor is configured:
to detect a downlink channel reserving signal from a serving base station;
to obtain a listen before talk (LBT) frame length from a downlink channel with the downlink channel reserving signal, wherein the LBT frame length identifies a length of a downlink portion of a next LBT frame;
to monitor for an uplink grant for one or a plurality of subframes of the next LBT frame; and
to determine to transmit on at least one subframe within the next LBT frame based on the uplink grant.

10. The apparatus of claim 9, further including configuration of the at least one processor:
to perform a clear channel assessment (CCA) check of a contention-based shared resource in response to the uplink grant and having uplink data for transmission;
to transmit the uplink data in response to the CCA check being successful; and
to refrain from transmitting in one or more remaining subframes of the next LBT frame after the transmission.

11. The apparatus of claim 10, further including configuration of the at least one processor:
to determine whether the CCA check is successful prior to a guaranteed channel reserving signal boundary, wherein the guaranteed channel reserving signal boundary includes a minimum duration of one or more channel reserving signals transmitted before uplink transmission on a next uplink subframe; and
to transmit the one or more channel reserving signals beginning at the guaranteed channel reserving signal boundary in response to determining the CCA check is successful prior to the guaranteed channel reserving signal boundary, wherein transmitting the uplink data is further in response to completion of the one or more channel reserving signals.

12. The apparatus of claim 9, further including configuration of the at least one processor:
to detect a user equipment (UE) status triggering a random access procedure; and
to send a random access message after a successful clear channel assessment (CCA) check in response to one of:
a last subframe of the next LBT frame when the uplink grant is detected; or
a next periodic random access occasion, wherein a periodicity of the next periodic random access occasion is obtained from a system broadcast message.

13. The apparatus of claim 9,
wherein the configuration of the at least one processor to monitor for the uplink grant includes configuration to monitor a downlink control channel on a primary component carrier of a non-contention-based frequency band, and
wherein the configuration of the at least one processor to determine to transmit includes configuration of the at least one processor:
to detect the uplink grant in subframe n; and
to begin monitoring for a next channel reserving signal after subframe n+k, where k is an associated time line for response of uplink transmission from uplink grant.

14. The apparatus of claim 9,
wherein the configuration of the at least one processor to determine to transmit includes configuration of the at least one processor:
to detect the uplink grant in subframe n; and
to assume the next LBT frame continues until subframe n+k, where k is an associated time line for response of uplink transmission from uplink grant.

15. The apparatus of claim 9, further including configuration of the at least one processor:
to receive a signal from the serving base station;
to blind decode the signal to determine one or more of:
a subframe during which the signal is received is a downlink subframe; and
the signal includes a channel state information reference signal (CSI-RS).

16. The apparatus of claim 9, further including configuration of the at least one processor to obtain a downlink-uplink configuration from the next LBT frame in the frame format indicator transmitted with the downlink channel reserving signal, wherein the downlink-uplink configuration identifies a division of the plurality of subframes between downlink, uplink, and special subframes.

17. An apparatus configured for wireless communication, comprising:
means for detecting a downlink channel reserving signal from a serving base station;
means for obtaining a listen before talk (LBT) frame length from a downlink channel with the downlink channel reserving signal, wherein the LBT frame length identifies a length of a downlink portion of a next LBT frame;
means for monitoring for an uplink grant for one or a plurality of subframes of the next LBT frame; and
means for determining to transmit on at least one subframe within the next LBT frame based on the uplink grant.

18. The apparatus of claim 17, further including:
means for performing a clear channel assessment (CCA) check of a contention-based shared resource in response to the uplink grant and having uplink data for transmission;
means for transmitting the uplink data in response to the CCA check being successful; and
means for refraining from transmitting in one or more remaining subframes of the next LBT frame after the transmitting of the uplink data.

19. The apparatus of claim 18, further including:
means for determining whether the CCA check is successful prior to a guaranteed channel reserving signal boundary, wherein the guaranteed channel reserving signal boundary includes a minimum duration of one or more channel reserving signals transmitted before uplink transmission on a next uplink subframe; and means for transmitting the one or more channel reserving signals beginning at the guaranteed channel reserving signal boundary in response to determining the CCA check is successful prior to the guaranteed channel reserving signal boundary, wherein the transmitting the uplink data is further in response to completion of the one or more channel reserving signals.

20. The apparatus of claim 17, further including:

means for detecting a user equipment (UE) status triggering a random access procedure; and means for sending a random access message after a successful clear channel assessment (CCA) check in response to one of:
- a last subframe of the next LBT frame when the uplink grant is detected; or
- a next periodic random access occasion, wherein a periodicity of the next periodic random access occasion is obtained from a system broadcast message.

21. The apparatus of claim 17, wherein the means for monitoring for the uplink grant include:
means for monitoring a downlink control channel on a primary component carrier of a non-contention-based frequency band, and wherein the means for determining to transmit includes:
means for detecting the uplink grant in subframe n; and
means for beginning to monitor for a next channel reserving signal after subframe n+k, where k is an associated time line for response of uplink transmission from uplink grant.

22. The apparatus of claim 17, wherein the means for determining to transmit include:
means for detecting the uplink grant in subframe n; and
means for assuming the next LBT frame continues until subframe n+k, where k is an associated time line for response of uplink transmission from uplink grant.

23. The apparatus of claim 17, further including:

means for receiving a signal from the serving base station; and means for blind decoding the signal to determine one or more of:
- a subframe during which the signal is received is a downlink subframe; and
- the signal includes a channel state information reference signal (CSI-RS).

24. The apparatus of claim 17, further including:

means for obtaining a downlink-uplink configuration from the next LBT frame in the frame format indicator transmitted with the downlink channel reserving signal, wherein the downlink-uplink configuration identifies a division of the plurality of subframes between downlink, uplink, and special subframes.

25. A non-transitory computer-readable medium having program code recorded thereon, the program code comprising program code for causing a computer to:

detect a downlink channel reserving signal from a serving base station;

obtain a listen before talk (LBT) frame length from a downlink channel with the downlink channel reserving signal, wherein the LBT frame length identifies a length of a downlink portion of a next LBT frame;

monitor for an uplink grant for one or a plurality of subframes of the next LBT frame; and determine to transmit on at least one subframe within the next LBT frame based on the uplink grant.

26. The apparatus of claim 25, further including program code for causing the computer to:

perform a clear channel assessment (CCA) check of a contention-based shared resource in response to the uplink grant and having uplink data for transmission;

transmit the uplink data in response to the CCA check being successful; and refrain from transmitting in one or more remaining subframes of the next LBT frame after the transmission.

27. The apparatus of claim 26, further including program code for causing the computer to:

determine whether the CCA check is successful prior to a guaranteed channel reserving signal boundary, wherein the guaranteed channel reserving signal boundary includes a minimum duration of one or more channel reserving signals transmitted before uplink transmission on a next uplink subframe; and transmit the one or more channel reserving signals beginning at the guaranteed channel reserving signal boundary in response to determining the CCA check is successful prior to the guaranteed channel reserving signal boundary, wherein transmission of the uplink data is further in response to completion of the one or more channel reserving signals.

28. The apparatus of claim 25, further including program code for causing the computer to:

detect a user equipment (UE) status triggering a random access procedure; and send a random access message after a successful clear channel assessment (CCA) check in response to one of:
- a last subframe of the next LBT frame when the uplink grant is detected; or
- a next periodic random access occasion, wherein a periodicity of the next periodic random access occasion is obtained from a system broadcast message.

29. The apparatus of claim 25, wherein the program code for causing the computer to monitor for the uplink grant includes program code for causing the computer to monitor a downlink control channel on a primary component carrier of a non-contention-based frequency band, and wherein the program code for causing the computer to determine to transmit includes program code for causing the computer to:
detect the uplink grant in subframe n; and
begin monitoring for a next channel reserving signal after subframe n+k, where k is an associated time line for response of uplink transmission from uplink grant.

30. The apparatus of claim 25, wherein the configuration of the at least one processor to determine to transmit includes configuration of the at least one processor:
to detect the uplink grant in subframe n; and
to assume the next LBT frame continues until subframe n+k, where k is an associated time line for response of uplink transmission from uplink grant.

* * * * *